United States Patent [19]
Peterson

[11] 4,055,746
[45] Oct. 25, 1977

[54] METHOD OF AND APPARATUS FOR SECURING AND STORING PERSONAL INFORMATION

[76] Inventor: Glen Peterson, 540 S. 83rd East Ave., Tulsa, Okla. 74112

[21] Appl. No.: 874,760

[22] Filed: Nov. 7, 1969

[51] Int. Cl.² .................. G06K 7/08; G06K 19/06
[52] U.S. Cl. .................. 235/61.7 B; 235/61.11 D; 235/61.12 M
[58] Field of Search .............. 340/174 SPM, 174 WC, 340/149 A, 149, 174.1, 174 M; 346/74 MP; 235/61.11 D, 61.12 M, 61.7 B, 61.12, 61.6 R

[56] References Cited
U.S. PATENT DOCUMENTS

| | | | |
|---|---|---|---|
| 2,254,933 | 9/1941 | Bryce | 235/61.114 |
| 2,914,746 | 11/1959 | James | 235/61.7 B |
| 3,210,527 | 10/1965 | Daykin | 340/174 M |
| 3,211,470 | 10/1965 | Wilson | 235/61.1 Z |
| 3,221,304 | 11/1965 | Enikeieff et al. | 235/61.7 B |
| 3,440,719 | 4/1969 | Meier et al. | 340/174 |
| 3,456,250 | 7/1969 | Barcaro et al. | 340/174.1 |
| 3,461,439 | 8/1969 | Kelly et al. | 235/61.12 |
| 3,513,298 | 5/1970 | Riddle et al. | 235/61.7 B |
| 3,564,210 | 2/1971 | Presti | 235/61.7 B |
| 3,588,449 | 6/1971 | Paterson | 235/61.7 B |

OTHER PUBLICATIONS

Aviles, J. F. et al., "A Read Only 70-NS Waffle Iron Memory," Sept. 1967, IEEE Transactions on Magnetics, vol. mag-3, No. 3, pp. 321–324.

*Primary Examiner*—Daryl W. Cook

[57] ABSTRACT

Secured computerized credit cards of the ferromagnetic storage variety, and a computer system that makes use of such cards at more than one geographic location. The card comprises a plurality of ferromagnetic elements, capable of storing binary indicia, sandwiched between thin sheets of plastic or other non-magnetic material. Security is provided by giving names to the two faces and four edges of the card and using said names to determine any one of eight ways which can be selected by the card owner for inserting the card into the computer and hence of programming the information stored on the card. Only the card owner knows the adopted name and an imposter has only one chance in eight of properly inserting and using the card. Optional means is also provided whereby the card owner can from time-to-time change the adopted card identification name. Means is likewise provided whereby the card-issuing agency can secure the issue of the card and the card's continued use and thereby prevent forgery.

3 Claims, 43 Drawing Figures

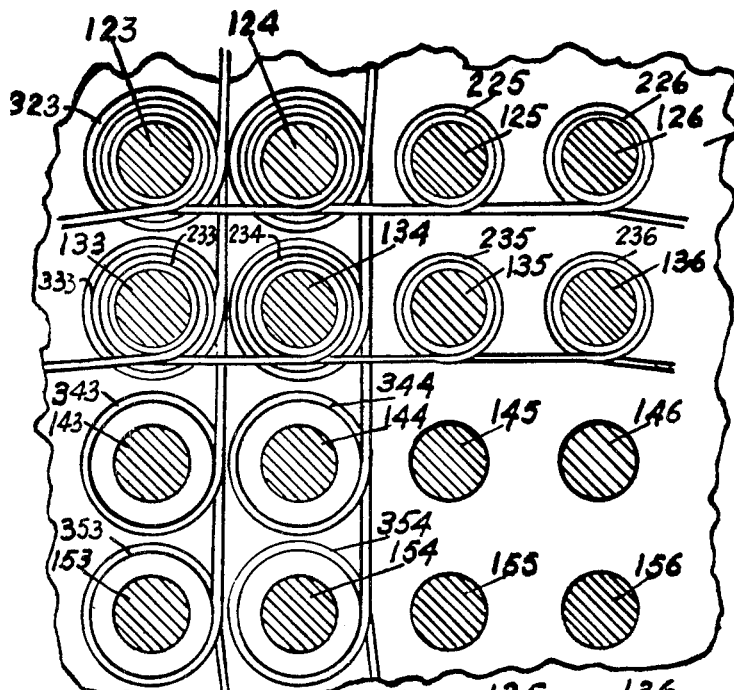
FIG. 11
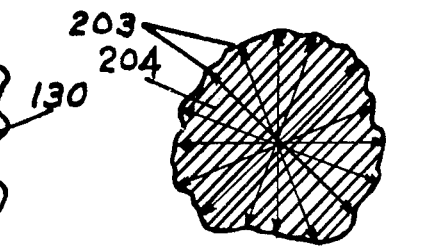
FIG. 19
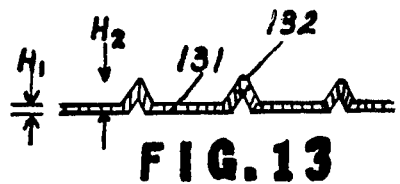
FIG. 13
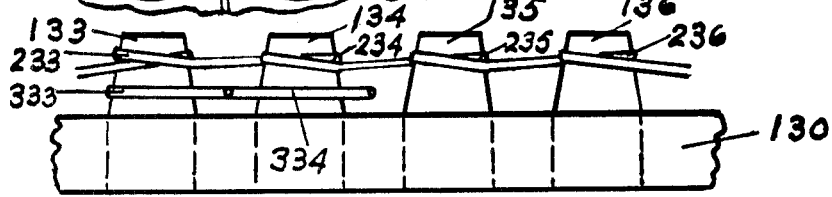
FIG. 12
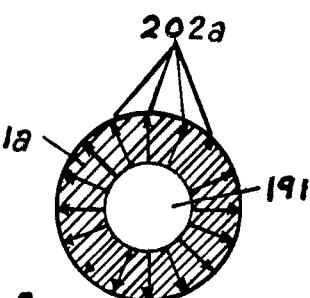
FIG. 14  FIG. 17
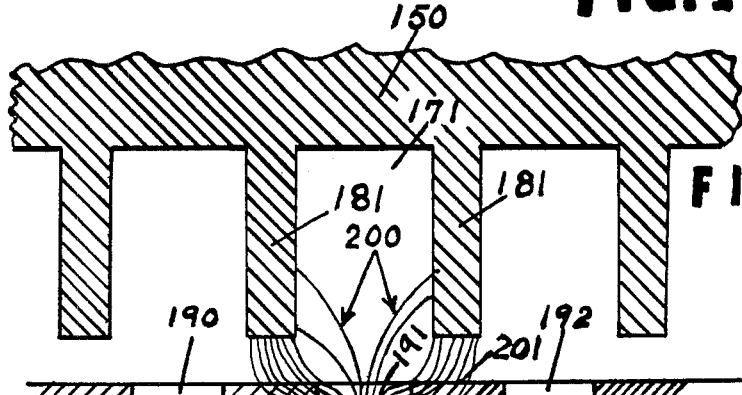
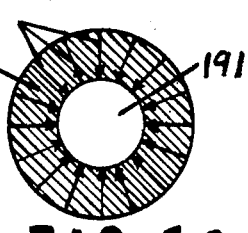
FIG. 15
FIG. 16  FIG. 18
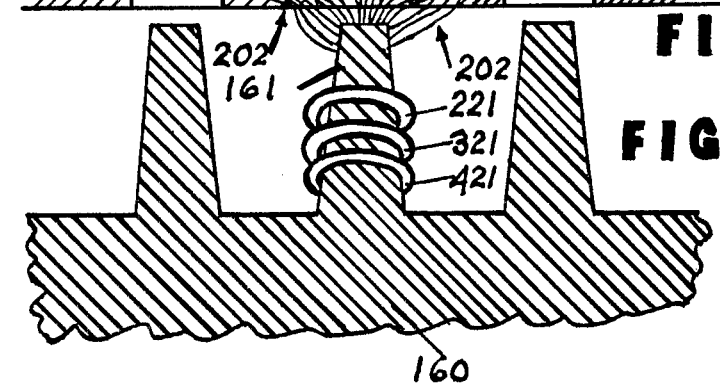

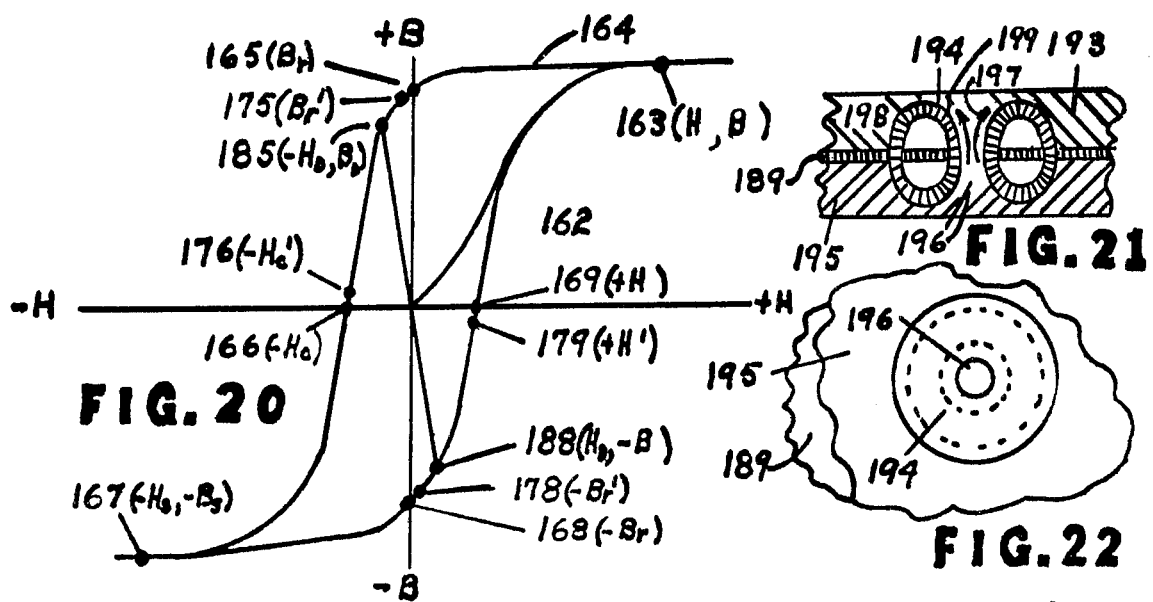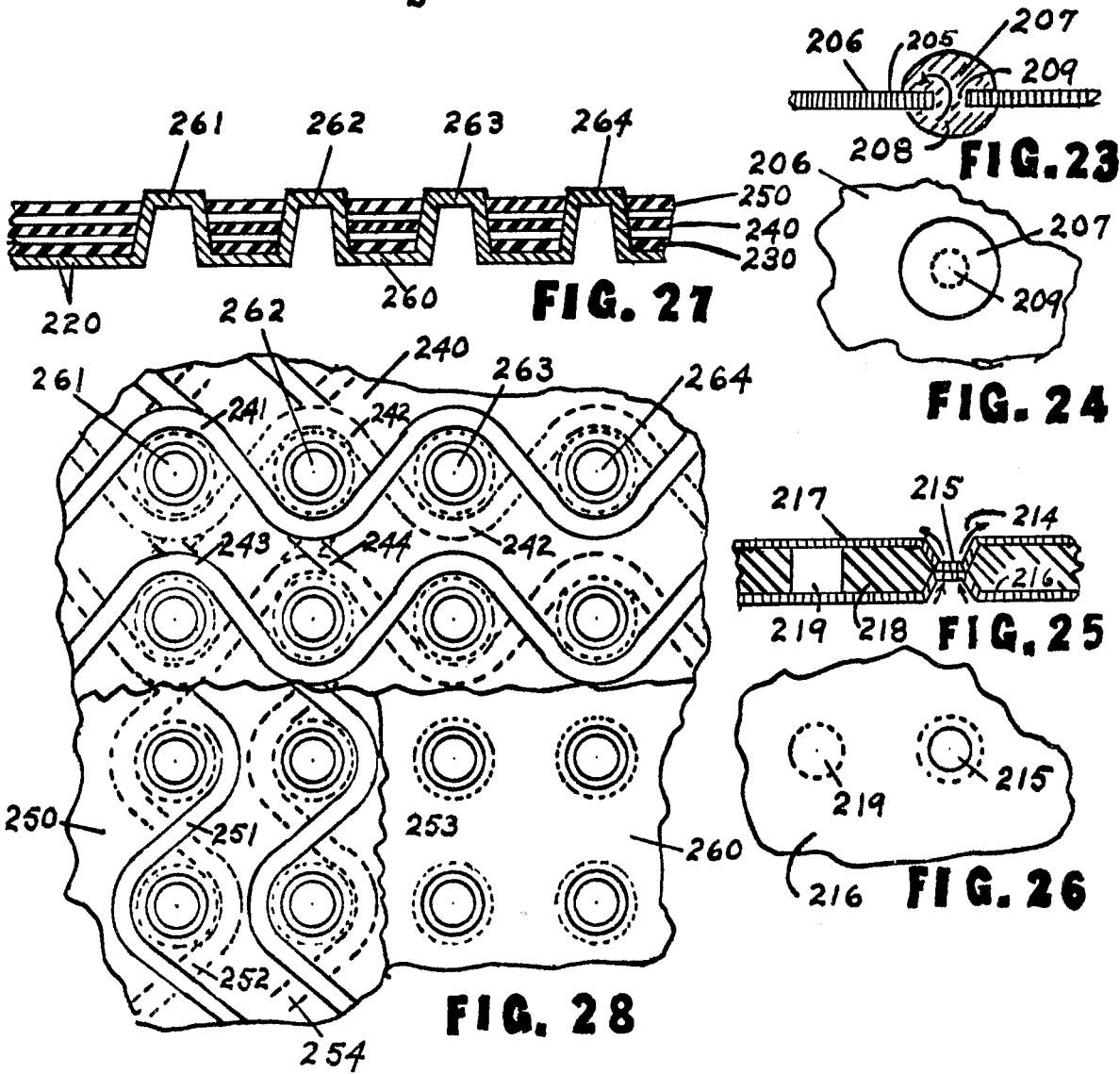

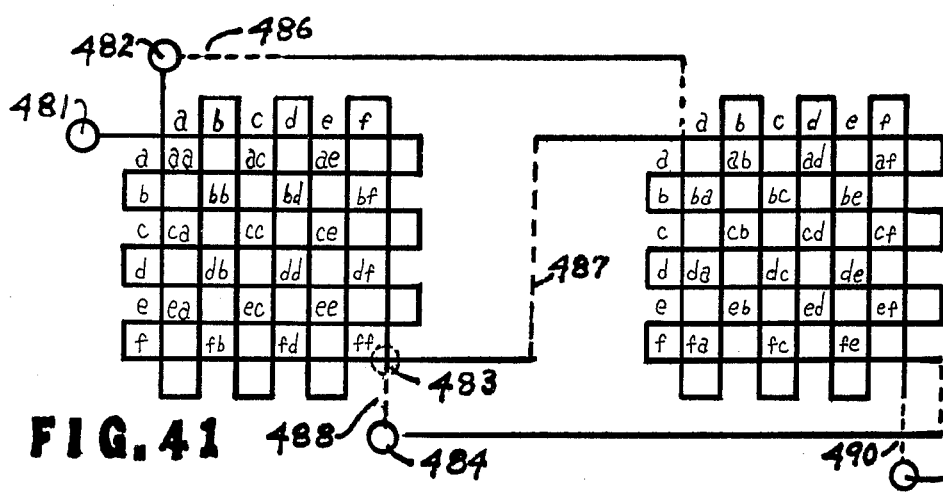
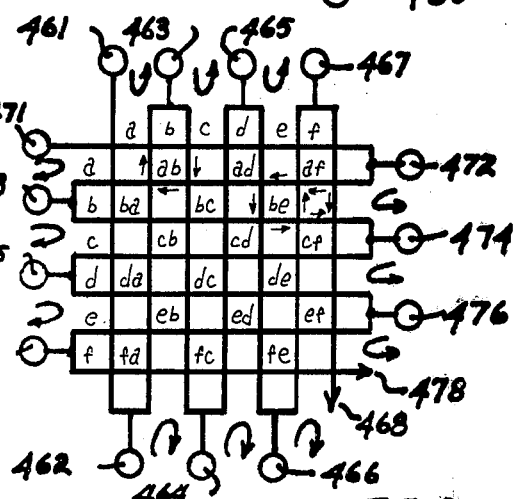
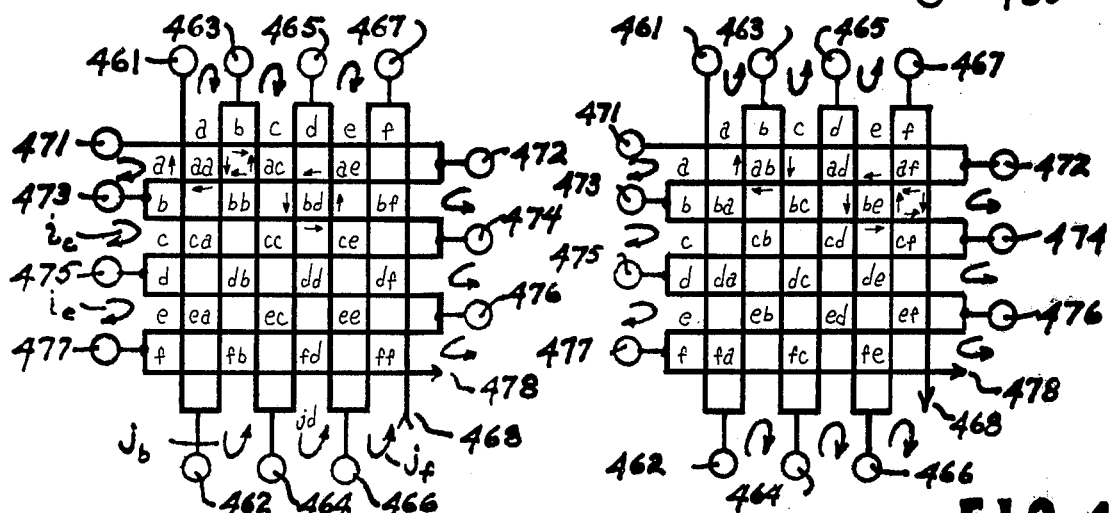
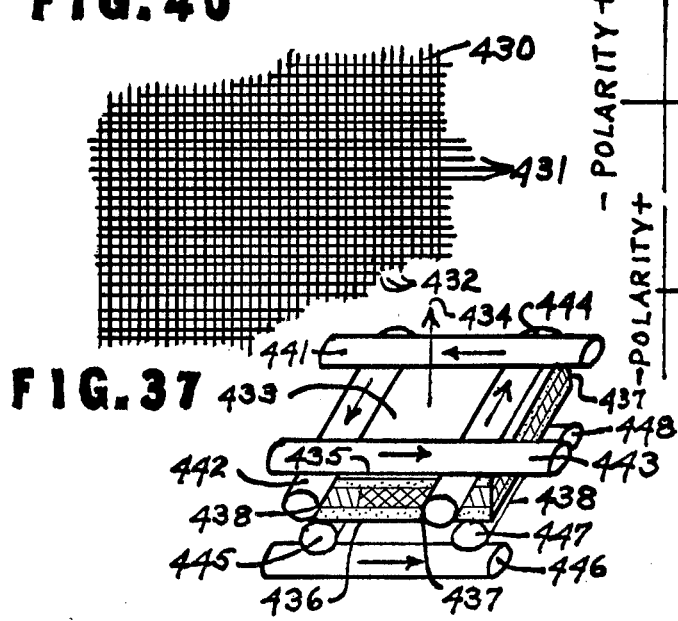

METHOD OF AND APPARATUS FOR SECURING AND STORING PERSONAL INFORMATION

This invention relates to the storage of information pertaining to people and their activities in modern digital computer code, to the personal control of this information, to its improved accessibility, and to the manipulation of this information as required by the multiple channels of commerce, industry, and of society as a whole.

The average computer stores all, or most, of the information it uses on the premises. This is true whether or not the computer internally contains all or part of the information in its memory banks, or stores all or part of this information on a system of punched cards, tapes, discs or drums. In either case, the information usually has to be located at the computer center which processes and uses it, or at least reasonably close thereto.

Again, the information fed into a computer, or stored within its memory banks, is usually the product of many people, and the suppliers of information, more often than not, are not the actual users of the information supplied.

The information particularly pertinent to people and their activities, on the other hand, is both supplied by a person and/or family and used by that identical person or family. Accordingly, the logical place to store this information is on the person, or within the control of the person or family, and not in a remotely located computer center where the information storage facility is probably already over-loaded. At the same time, for a person to make full use of his personally-stored, and controlled, information in our modern highspeed world, it is sometimes necessary to make part or all of it available to a computer.

For example, a man might have a bank balance of so-many dollars. This is really only this particular man's personal business. At the same time, this man might wish to buy a tank of gas for his automobile, or purchase a new washing machine for his wife — on credit. Accordingly, both the Service Station owner and the Department Store owners have at least a momentary ligitimate interest in the man's bank balance as well as his "pay habits". If both the bank balance and "pay habits" are available on the man in a form that can be recognized by computers in the possession of both merchants the dilemma can be readily solved without a word being exchanged. Given the monetary use of the man's information card, and with previously programmed instructions, the computer only made to come up with one of two useful answers: "Sell" or "Don't Sell".

Another problem which we have in the modern world is that of stolen or improperly used credit cards. Even though signatures, and occasionally finger-prints, may be required, the legitimate use of a credit card cannot be certain unless hand-writing and finger-print experts are on hand. At the present time we do not have computers with hand-writing and finger-print expertize.

Still another problem that we have in the modern world is the illegitimate use of personal information by governments, corporations or other large organizations. As above shown in the example of the merchants, governments, corporations and other organizations may from time-to-time have a legitimate temporary requirement for some portions of personal data which completely and permanently belongs only to a person. Accordingly, a means of supplying this information, and only this information, on a temporary basis, and with the consent of the owner, is required.

One of the most prized possessions of a person is the information pertinent to this person. Information which completely identifies, distinguishes, and characterizes a person is almost as sacred as the person and might, in many respects be said to be the person. In many countries of the world, governments have gained possession of personal information pertaining to their citizens and used it maliciously and willfully to imprison, destroy or otherwise capture full and complete control of their constituents. Even within our own country there are those who would upon occasion make improper use of personal information. Sometimes those who would abuse personal information are law enforcement officers or agencies with good intentions, or they may be personal departments of large corporations with equally good intentions. Again, some who abuse personal information are black mailers. At the same time, and as already stated, there are times and occasions when a person for his own good and benefit needs to make some or all of his personal information available to another. In all cases, unless a legitimate court rules otherwise, the control of personal information should at all times remain with the person and the information kept as sacred and inviolate as the person himself.

The overall problem is somewhat related to a safety-deposit box where personal belongings and information are frequently stored. All such boxes usually have two keys and can be opened, and the contents examined when both keys are fitted into their respective locks. One such key is kept by the person renting the box and the other key is usually supplied by the lessor of the box.

The fundamental object of this invention is to provide a relatively simple and inexpensive method and means whereby personal information may be stored in a convenient and compact form. Another objective is to store this information in a form which can immediately be accepted into, and assimilated by, a computer. Still another object is to store and release this information in such a manner that the release of personal information is always under the control of the person who truly owns said information. A fourth objective is to positively identify with a particular person, and in a manner as certain as a person's signature or finger-prints, a package of information said to belong and pertain to said particular person. A fifth objective is to provide a means whereby another person or agency can be given temporary (usually momentary) access to all, or any fraction, of a person's personal information (his dossier) at the option and under the control of the person to who the personal information, or dossier, belongs. A sixth object is to provide a single standardized card which can be universally used by all individuals and all agencies. A seventh objective is to provide a computer system which can accept and assimilate information received from a wide variety of sources.

These and other objectives and features of the present invention will become completely clear upon the consideration of the further specification and drawings, wherein.

Figure 4:
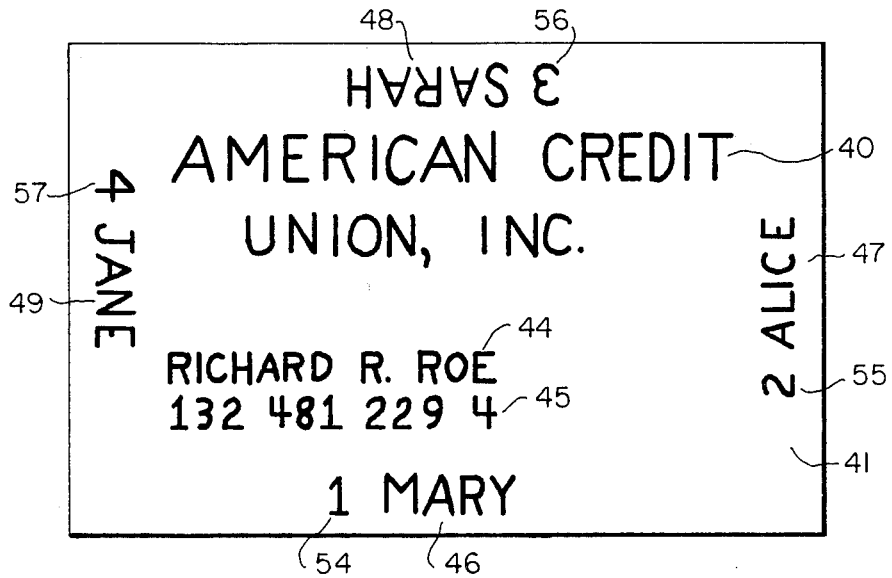
Figure 5:
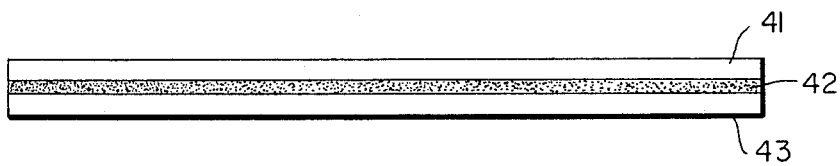
Figure 6:
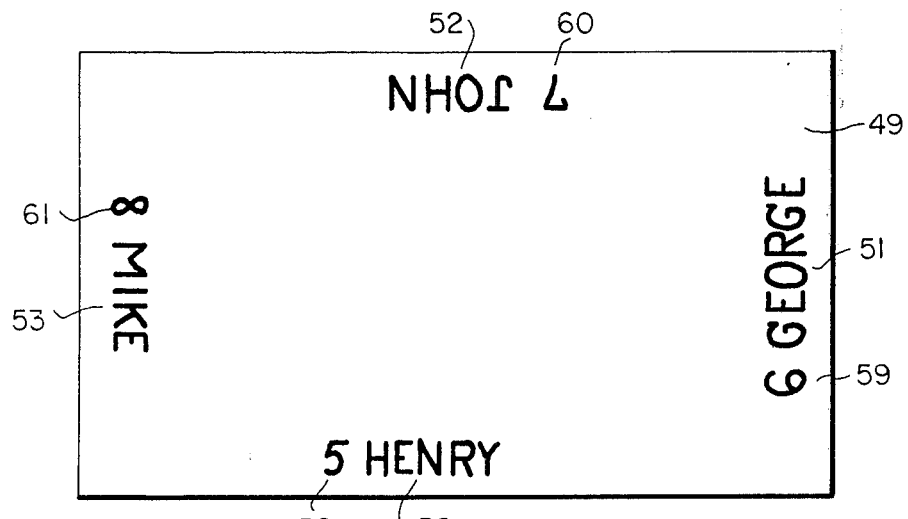

FIGS. 4, 5, and 6 are drawings of the personal information dossier of this invention, showing top, edge and bottom views respectively.

Figure 7:
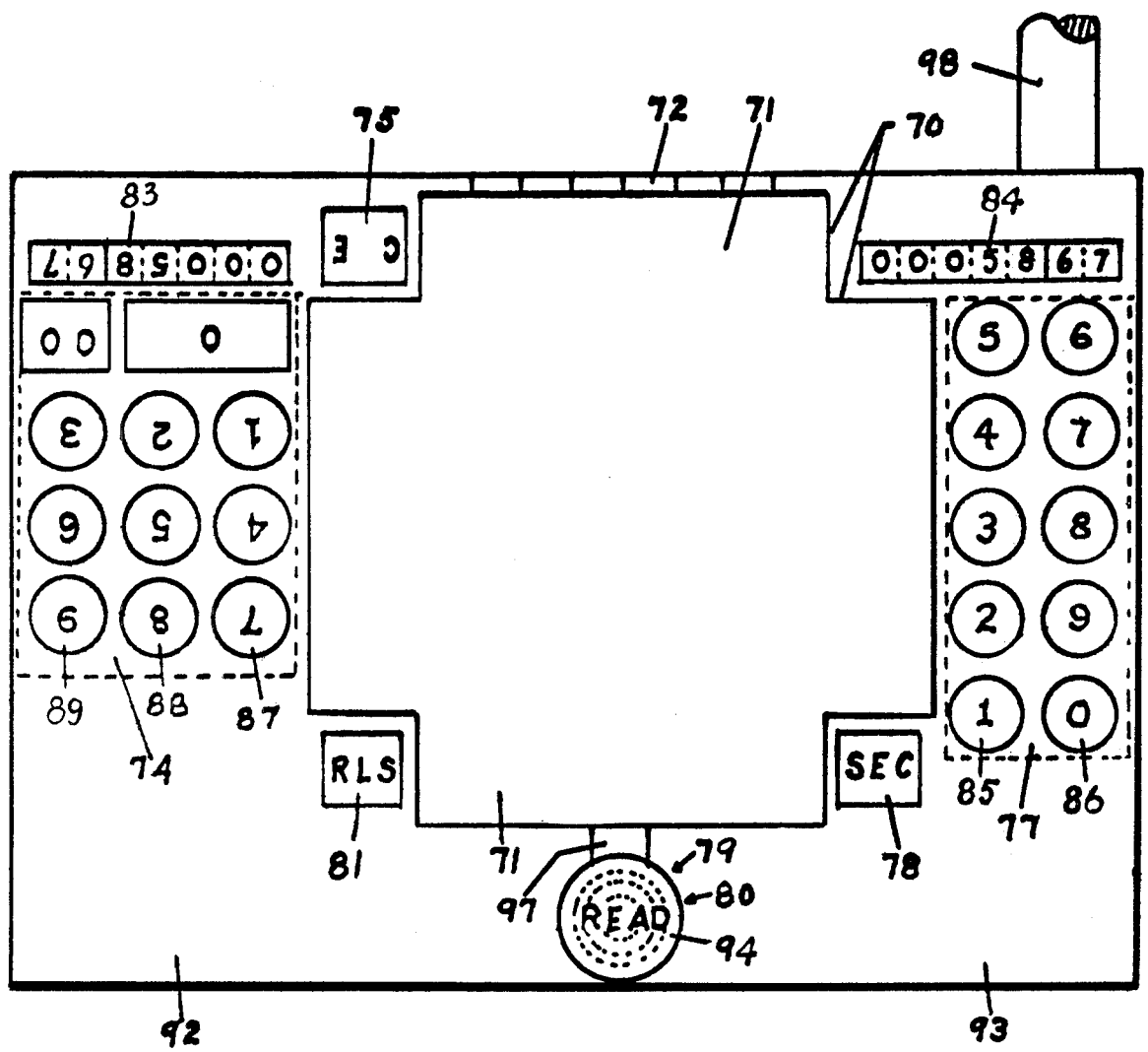

FIG. 7 is a drawing in plan view of one form of information readwrite computer head of this invention, with the cover down and the head in the closed or operational condition.

Figure 8:
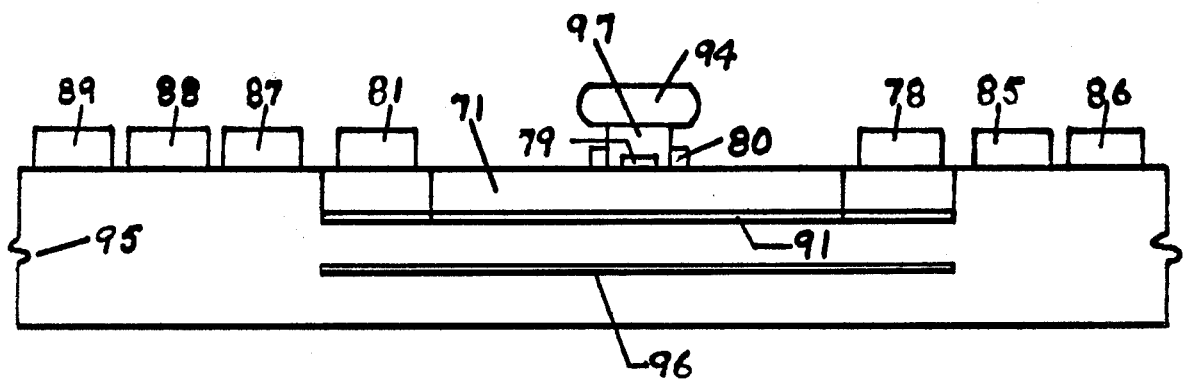

FIG. 8 is an elevation of the read-write computer head of FIG. 7.

Figure 9:
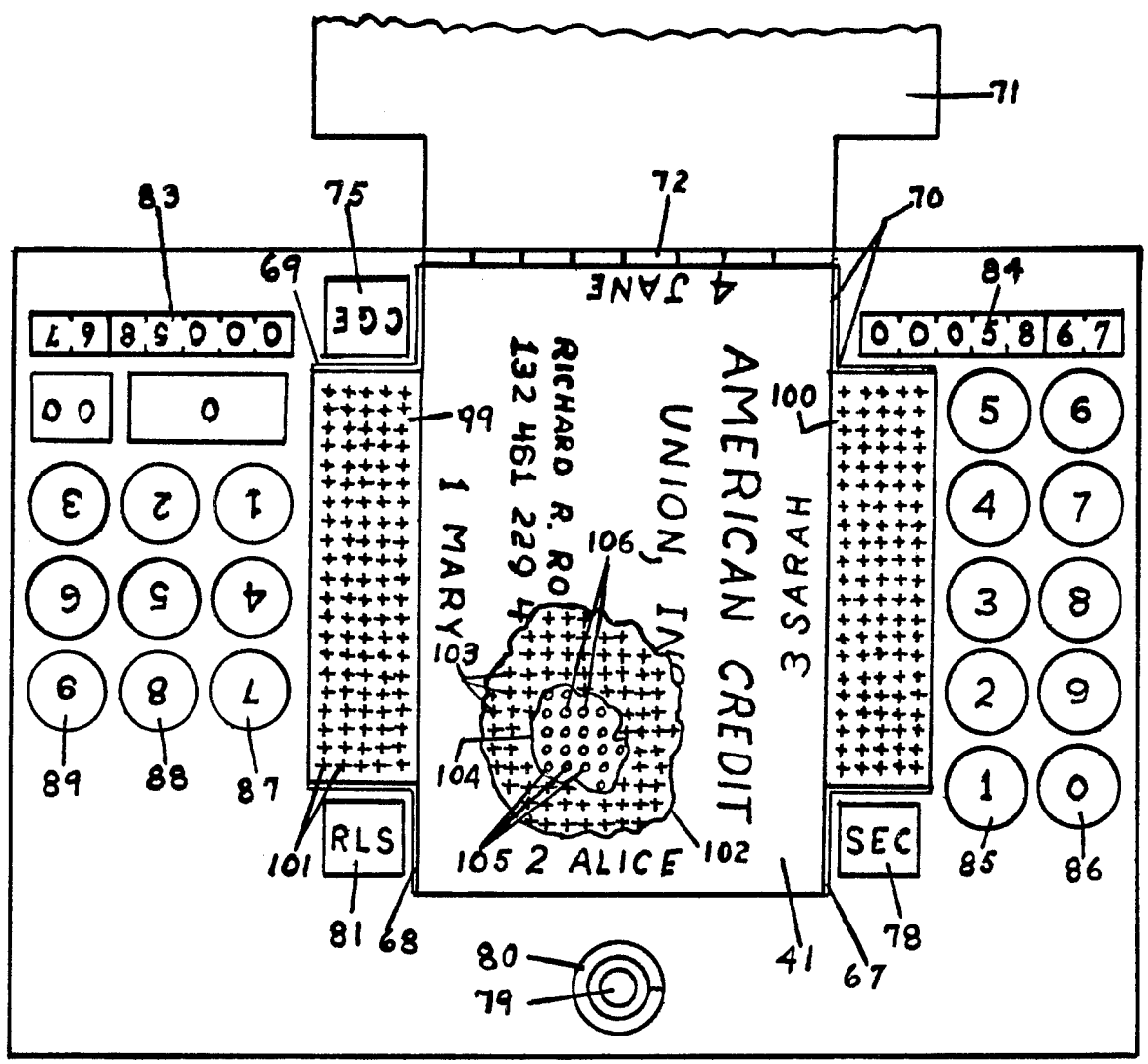

FIG. 9 is a drawing in plan view of the read-write computer head of FIG. 7, with the cover open and the personal information dossier of FIG. 4 shown in one of eight possible orientations.

Figure 10:
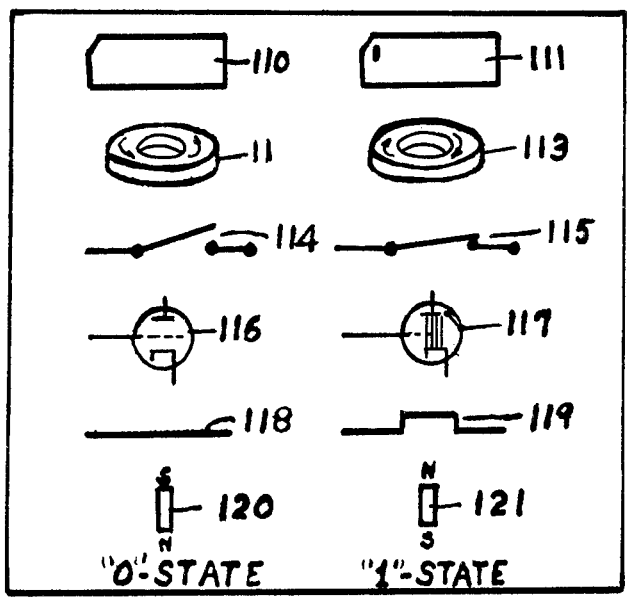

FIG. 10 is a sketch of several typical binary indicators which are employed in modern electronic computers.

FIG. 11 is a greatly enlarged sectional plan view of a fraction of the read-write head of FIGS. 7 through 9.

FIG. 12 is the corresponding enlarged elevation view of FIG. 11.

FIG. 13 is an enlarged sectional view of the recording medium of the personal information dossier of FIGS. 4 through 6, showing an improved construction.

FIGS. 14 and 16 are greatly enlarged cross-sectional views of improved embodiments of cover and base, respectively, of the read-writer head of FIGS. 7 through 9.

FIG. 15 is a corresponding enlarged cross-sectional view of a recording medium employed in the personal information dossier of FIGS. 4 through 6.

FIGS. 17 and 18 are greatly enlarged plan views of one storage bit of the recording medium of FIG. 15, showing the two binary states which can be taken by each bit.

FIG. 19 is a corresponding plan view showing one state of a typical storage bit when the simpliest form of storage medium is used.

FIG. 20 is a graph of a typical hysteresis performance loop of the storage media of the personal information dossier of FIGS. 4 through 6, used to explain the operation of the several forms of binary storage bits.

FIGS. 21, 23 and 25 are enlarged cross-sections showing the construction of typical storage bits of three alternative forms of construction.

FIGS. 22, 24 and 26 are corresponding plan views of the alternative storage bits of FIGS. 21, 23 and 25, respectively.

FIG. 27 is an enlarged fragmentary cross-section of a typical read-write head provided by the invention for putting information on cards in the form of binary indicia, reading the information on the card, or removing the information and replacing it with other information, or the same information re-arranged.

FIG. 28 is an enlarged plan view of the fragmentary read-write head of FIG. 27, showing how details of construction are carried out.

Figure 29:
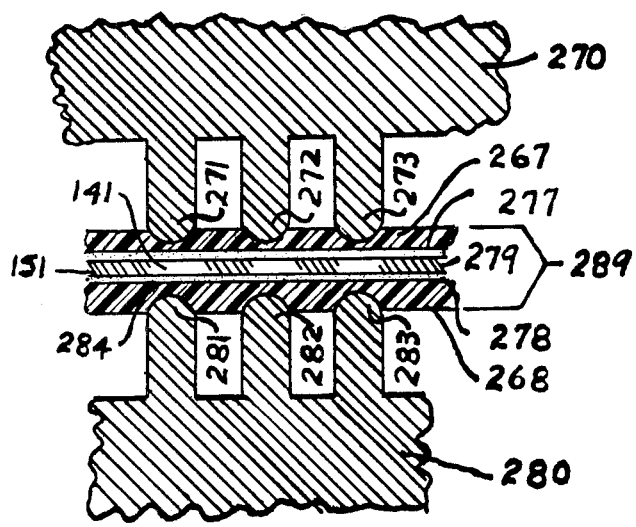

FIG. 29 illustrates in greatly enlarged cross-section the combined constructions of still another form of read-write head and corresponding recording medium of the personal information dossier.

Figure 30:
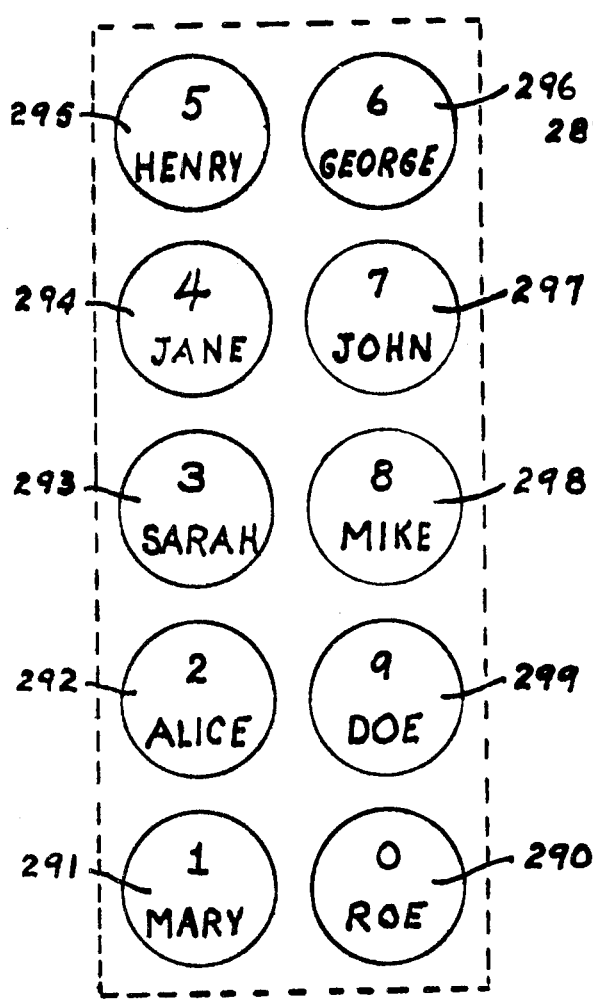

FIG. 30 is a sketch showing in greater detail some of the features of the programming keys of the read-write computer head of FIGS. 7 through 9.

Figure 33:
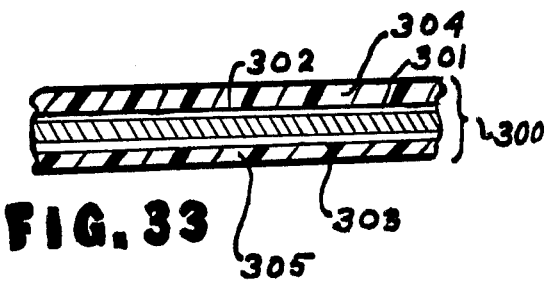

FIG. 33 is an enlarged cross-section of a preferred form of recording medium used by the personal information dossier of FIGS. 4 through 6.

Figure 32:
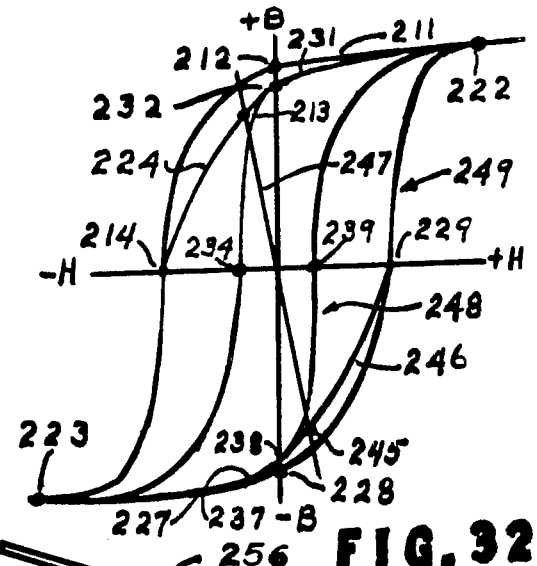

FIG. 32 is a graph of the hysteresis loops of the recording medium of FIG. 33.

Figure 31:
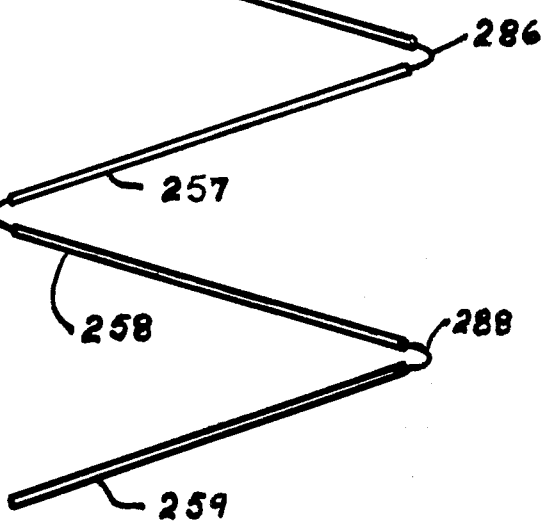

FIG. 31 is a sketch in edge view showing how more than one personal information dossier cards can be combined in a single convenient package.

Figure 34:
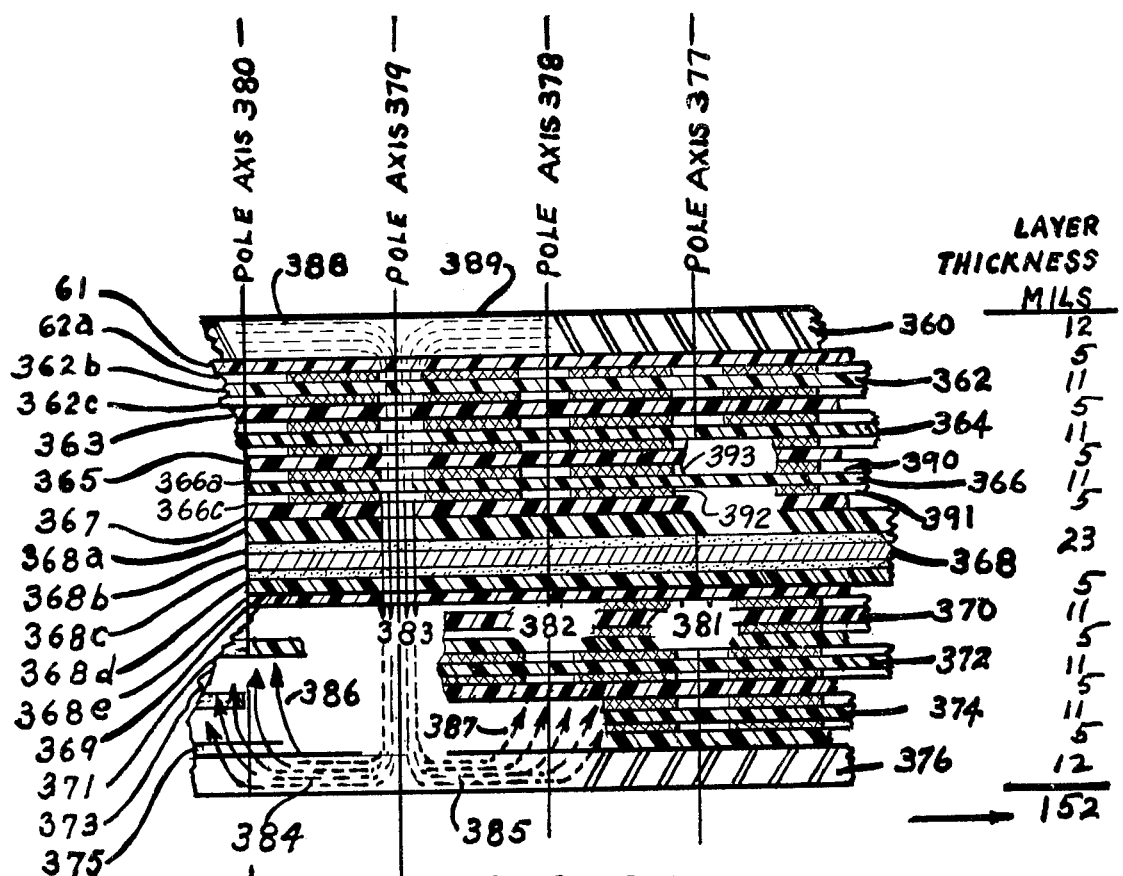

FIG. 34 is a greatly enlarged cross-section of the preferred recording medium of this invention as applied to computer memories generally.

Figure 35:
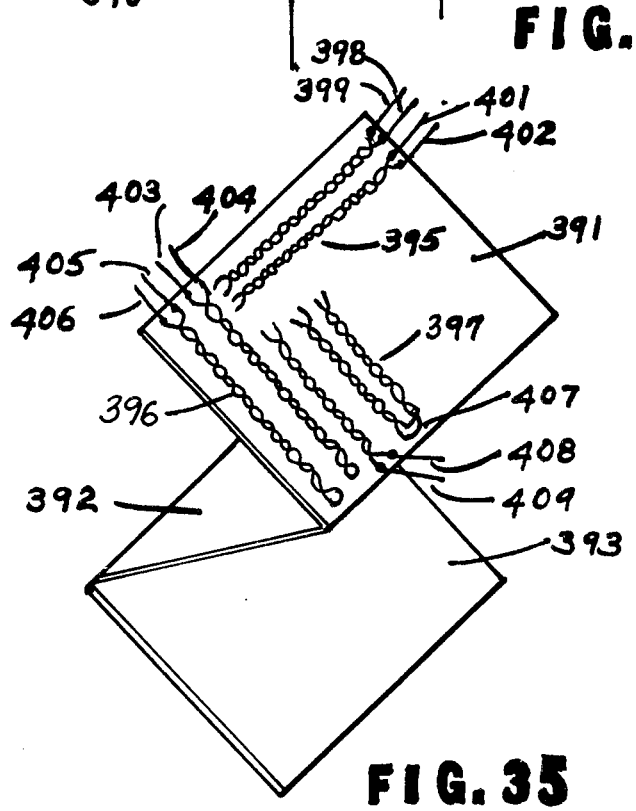

FIG. 35 is a sketch showing how a large computer memory having the form of FIG. 34 can be folded to provide a large memory bank in the form of a book.

Figure 36:
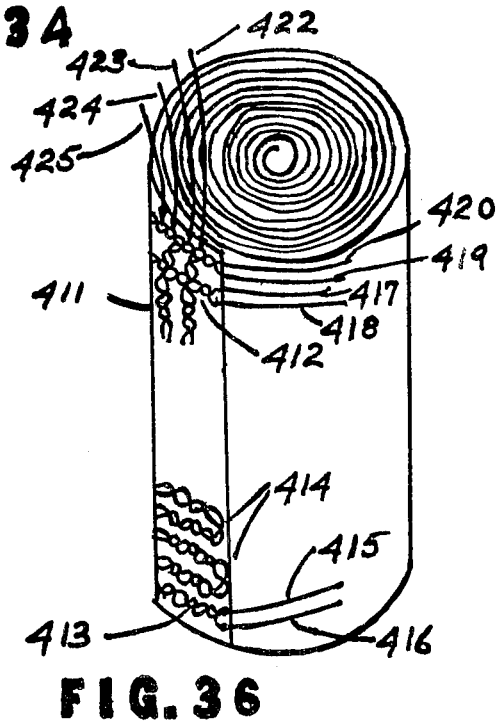

FIG. 36 is a sketch showing how a large computer memory having the form of FIG. 34 can be packaged in a compact roll.

FIG. 37 is a drawing in enlarged plan view showing the disposition of conductors and bit areas in a memory sheet having a rectangular array of conductors.

FIG. 38 is a drawing in perspective view showing the detailed construction of a bit in a large memory sheet, enlarged many times.

FIG. 39 is a graph illustrating one sequence of pulses to read from and write on the preferred form of memory sheet of this invention.

FIGS. 40 and 40a are greatly enlarged views of conductor patterns used in the preferred form of memory sheet of this invention.

FIGS. 41 and 41a are corresponding greatly enlarged views of another conductor pattern required by the preferred form of memory sheet of this invention.

Figure 1:
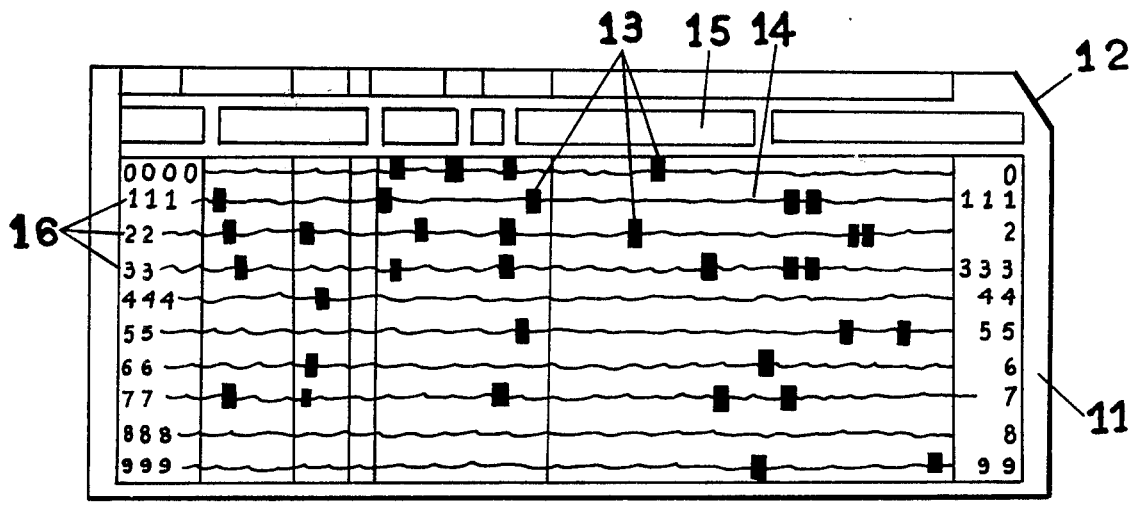
FIG. 1 is a drawing of a typical punched card used by computers and often identified as an "IBM" card, a designation which comes from the originator of the card.
Figure 2:
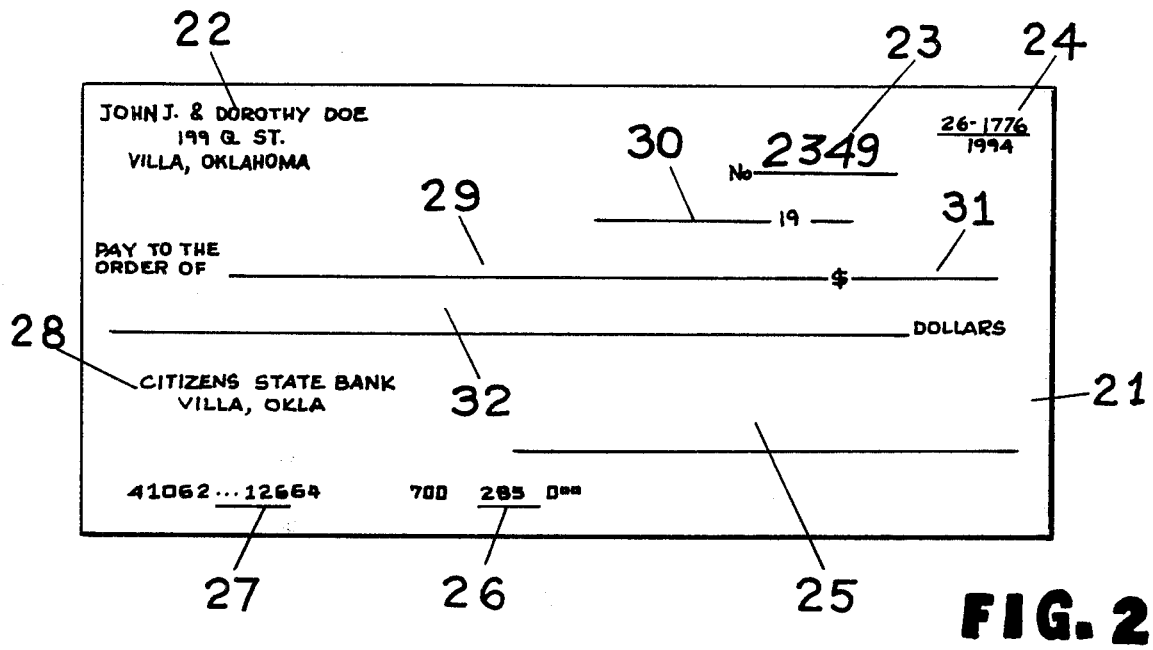
FIG. 2 is a drawing of a typical check as used by modern banks and their customers.
Figure 3:
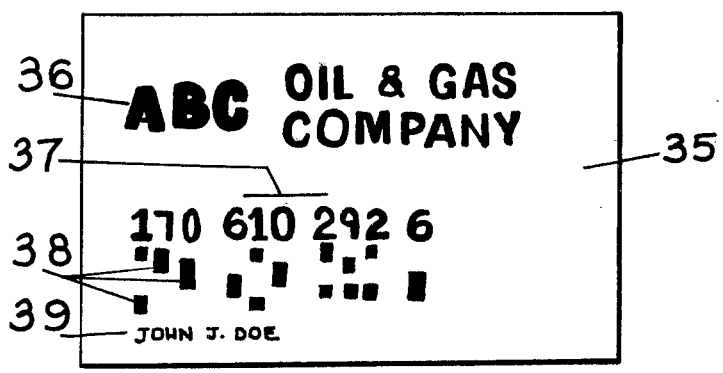
FIG. 3 is a drawing of a modern plastic credit card.

FIGS. 1 through 3 illustrate typical areas where personal information are required and some forms of how it is being stored at the time my invention was made. Referring to FIG. 1 specifically, 11 indicates a typical punched card capable of storing some 960 bits of information — a bit, in the language of computers being a "1" or a "0" of binary code, and the "1,0" combination representing the two possible states of many storage devices, as depicted by FIG. 10, and as will more fully be described subsequently. Returning to FIG. 1, 12 is the slanted corner of the punched card by means of which the card is oriented in a punching or reading machine; 13 refers to typical punches, or "1's" on the card; 14 refers to typical unpunched positions on the card, or "0's"; and 15 refers to the printing on the card that is used in identifying areas or in giving instructions. 16 refers to numbers which identify rows and columns on the card.

FIG. 2 shows a typical bank check 21, having a depositor's name and address 22; a serial number 23, the bank's federal reserve number 24, a line for the depositor's signature 25, the depositor's account and processing number 26, in magnetic ink, the bank's identifying and processing number 27, likewise in magnetic ink, and 28 the bank's name. The check also provides the other usual lines or spaces for writing the name of a payee 29, the amount for which the check is written 31 and 32, and a space 30 for the date.

FIG. 3 shows a typical plastic credit card 35 as today provided by many merchants and credit agencies. 36 indicates the name of the company issuing the credit card; 39 is the name of the person to whom the card is issued; 37 is the credit card or account number; and 38 refers to a number of marks on the card which serve in the same capacity as punches on a punched card and provide some small amount of information for the issuing company. Items 37, 38 and 39 are usually in the form of raised or embossed characters.

Cards, such as that of FIG. 3, are today issued by many companies and sent through the mail to people without ever having been requested. The average adult in the U.S. today carries a half-dozen or more such cards in pocket, wallet and/or purse, and for which he is usually made responsible, with no means of protection whatever provided. Almost any one can use anybody's card with no questions asked.

Other typical personal information forms, not illustrated, are bank deposit slips, notes of debt and credit, mortgages, birth certificates, insurance policies, employment application forms, personnel records in the files of companies, diplomas and other certificates of accomplishment, genealogical records, etc. These and others are the cards, forms and papers typical of the commercial and social requirements made upon people in the modern world and much space is required to store and use this information in legitimate transactions, and altogether too often any more the information pertaining to people and their activities is given illegitimate use by unscrupulous individuals and organizations and without a person's knowledge, much less his consent.

Another problem with which any generalized system of personal information must ultimately be concerned is the storage problem itself. It can be shown that if 100 pieces of information pertaining to and completely identifying each of the 200-million people of the U.S., with each piece of information having an average of 3 words, was stored in a central computer by the most compact and condensed storage means and techniques presently available, a storage facility $100 \times 100 \times 100$ feet $= 1$ million cubic feet, would be required. To gain access to so vast a storage and make it available in all parts of the world, where today people travel, at all times of the day and night, would not only require a gigantic high-speed sorting mechanism, many duplications of facilities, but equally gigantic interconnecting cables and inter-communciation networks. Again, since personal information changes from day to day, means for changing, adding or deleting information would have to be provided and disciplined. Perhaps the worst feature, however, is that once personal information is given any kind of general storage, the person whose property the information is, loses control of it. This adverse feature of the modern computer grows in daily importance, and in future years will have even greater negative impact as we become the victims of our own computer. Even when no dishonest or unscrupulous intentions are present, if one's account or personnel record gets "fouled up" in a computer, it takes practically a letter to the president of the company to get the matter straightened out. The usual computer file clerk pays no attention whatever to letters, is as incoherent as an unprogrammed computer, and unless some means for individually entering complaints on a punched card is one day provided, the situation appears hopeless.

Considering all problems relevant to people and their activities as individuals, the present invention provides a solution through the recognition of the following principles:

1. The person who provides the information is the only legitimate owner of the information provided;
2. The person who provides the information is involved in each and every transaction of the information and should usually be present at the transaction;
3. People or agencies other than the individual who owns the information may have a legal or legitimate requirement for portions of the information on a permanent basis;
4. People or agencies other than the individual who owns the information may have, or be given, a temporary legitimate use of portions of the information;
5. When the person who provides the information is not present at a transaction, there is, nor can be, no legal or legitimate requirement for the information. Being present in the sense of this principle is not necessarily restricted to exact geographical presence. If a person in Chicago of his own volition puts his information dossier into a computer that communicates with New York, for example, and for the express purpose of doing business in New York, this person is present in New York for the particular transaction carried out by the computer into which he put his dossier.

When these principles are fully understood and recognized, it is found that all problems relating to people and their activities in the modern world can be solved by:

I. Providing each person with a dossier of information in a form that can be mechanically handled and assimilated by a computer;

II. By each person or agency wishing to avail itself of all or any part of said information dossier, providing itself with a computer capable of intercepting and assimilating said information when given permission to do so;

III. By providing a non-forgeable act of individual volition for the release of information from a personal information dossier, other than the mere presentation of the dossier.

FIGS. 4, 5 and 6 show a personal information dossier, hereinafter sometimes identified as a PID, in the form of a card only a little larger than a typical credit card, that is capable in the most compact and condensed embodiment of storing at least 4,000 bits of information in the binary code, or 111 36-bit words in the most general form of computer coding. If only numbers are stored in five digits, say, 4,000 bits would accommodate 200 such numbers; or if words and numbers are stored, the usual case, the storage capacity of the above card would average 156 words and numbers. This amount of storage is more than adequate to handle the combined banking and credit activities of most people. Businesses, of course, could adopt the same system by using the same system and larger cards. For example, the standard IBM card, employing the method and means of this invention would hold 7200 bits, as compared with the present 960 bits, and an $8\frac{1}{2} \times 11$ sheet would hold 37,800 bits, or more than a thousand words. The thickness of either card or paper would not have to be much greater than it presently is, and could be used over-and-over again when the information stored was no longer needed.

A bit, as illustrated in FIG. 10, and as is well-known in computer technology, is a 1,0 state or stored condition, sometimes temporary, sometimes permanent. For example, the punch in the IBM card 111, FIG. 10, represents the "1"-state of a bit, while no punch in a place that can be punched represents the "0"-state. Similarly, the magnetization of a ferromagnetic ring core in the counter-clockwise direction 112 can be used to represent the "0"-state of a bit, while magnetization in the clockwise direction 113 can be used to represent a "1"-state. Again, an open switch 114 can be a "0"-state with the same switch closed representing the "1"-state. A non-conducting vacuum tube 116, or transistor, can be used for a "0", and the conducting state 117 of the same devices employed for a "1". Furthermore, a pulse of current 119 in a working memory circuit capable of being pulsed at a certain instant of time is a "1", while no pulse 118 is a zero. On magnetic storage films and tapes, the two possible polarities of magnetization, 120 and 121, are used to represent the "0"- and "1"-states, respectively, of a binary bit.

In the present invention, use is made of magnetically-stored bits, as 112 and 113, FIG. 10, or 120 and 121, with the storage being made upon one or more thin films, or small pieces, of magnetic material, 42 of FIG. 5, which lays the full extent of the card in both directions and which is sandwiched between two thin pieces of non-magnetic material 41 and 43. The non-magnetic material can be plastic, or some equally suitable substance, while the magnetic material in the most simple form may be a single sheet of material similar to that presently used by magnetic recording tapes. In the preferred embodiment of this invention, however, the magnetic material 42 is comprised of three sheets of magnetic material in close relationship as will be subsequently described and explained.

FIGS. 11 and 12, scaled-up about 8:1, shows the pole structure of one form of read-write computer head of this invention, and which is employed in conjunction with th PID-card of this invention. Each little circle, as 123, 124, 125, 126, etc., represents a magnetic pole of the read-write head. This construction contemplates placing the poles on one-eighth inch centers; whereas, more advanced embodiments of the invention to be described later contemplates a pole density of 400 poles to the square inch or placement on one-twentieth inch centers. As shown in FIGS. 11 and 12, each magnetic pole is wound with one or more coils of wire 233, 234, 235 . . . . and 333, 343, 353 . . . ., systematically arranged in rows and columns, as shown.

As noted, each circle of FIG. 11, as 123, 124, 125 . . . ., represents a magnetic pole that is capable at each prescribed instant of time of being magnetized in one of two directions, 120 and 121, FIG. 10, as determined by the direction of currents flowing in the coils about each pole. Correspondingly, a PID-card, once it has been placed in the read-write head and the circuits feeding the coils activated, will have magnetized areas, but these will not usually be discernable to the eye or capable of being detected without the means of this invention.

While we could use magnetized and non-magnetized states for our bit code, it is preferable to use the two possible directions of magnetization. We can arbitrarily say, for example, that when the North Pole of the magnetized spot is on the underside of the card, with the South Pole on top, we have a "0"; while if the North Pole is on top and the South Pole down under, we have a "1". Such arrangements completely conform to present computer practice and thereby avoids interpolation units. Again, areas that are completely magnetized (saturated) in one direction or the other are nearly immune to demagnetization by extraneous external fields because it requires a field sufficiently strong to flip the direction of magnetization over to the opposite direction to do any damage.

With the bit areas of each card thus magnetized, two methods of read-out are possible. The card can be placed in the read-write head, FIGS. 7 through 9, the handle knob 94 pushed down suddenly, bringing the cover 71 against the face of the card that has previously been inserted under the cover, and thus plunging the card into immediate and intimate contact with the reader head pole structure. This sudden action closing the gaps between the tiny card polarized magnetic areas generates voltage in the little coils wound around each pole of the reader head. With this type of readout, the coils 233, 234, 235 . . . ., would preferably be multi-turn coils rather than single-turn loops as illustrated. One can get at least 500 turns of AWG 41 insulated magnet wire, and correspondingly more turns of smaller wire sizes, on the pole structure shown in FIGS. 11 and 12.

The polarity of the voltages and hence the direction of flow of currents in the coils will depend upon the polarity of the magnetic spots on the PID card, and the direction of these currents determines whether a "0" or "1" is represented. In this embodiment of the invention, suited only to the very simplest applications of this invention, each coil of the read-write head would be required to have separate connections into a computer input circuit.

The other type of readout now possible with our binary-coded PID card is what, in computer terminology, is called destructive readout, and is much preferred. Referring specifically to FIGS. 11 and 12, which as stated are enlarged fragmentary views of one embodiment of read-write head, an arrangement is shown whereby poles are energized in rows and columns and read in the same way. Accordingly, single-turn coils 233, 234, 235 . . . . are placed over each pole in a row, with all coils connected in series, while single-turn coils 323, 333, 343, 353 . . . . are similarly placed over each pole in a column, again with all coils connected in series. Thus, each pole has at least two coils around it and usually three. One-half the current required to completely flip a pole from magnetic saturation in one direction to magnetic saturation in the opposite direction is sequentially fed to a column and row of coils at a time until the entire field of poles has been scanned. At any particular instant of time only one pole has both the row and column currents applied to it at the same instant and therefore sufficient ampere turn to "flip". If the pole is already saturated in the direction of the combined row and column currents, nothing happens particularly, except that the pole is momentarily carried still further in the same direction of saturation, but it immediately falls back to where it was. But if the direction of magnetization of the pole and the combined row and column currents disagree, the pole gets almost instantly flipped to the opposite polarity. When this happens, the stored magnetic energy, plus the energy of flip, produces a signal in the circuit of the third set of coils, as 421, FIG. 16, or the printed circuit sheet 230, FIG. 27. This third set of coils are all connected in series, columns and rows alike, and destructive readout is obtained by means of the signal suddenly induced in a particular readout coil when the pole about which it is wound is suddenly flipped from one state to the other. Since the state of a pole may be destroyed through this form of readout, the computer must restore this state if the memory is to be preserved. This, the computer is automatically programmed to do from its working memory, the instant readout has been completed or shortly thereafter.

Sometimes additional coils are used for special purposes; nevertheless, all are of the row-column or readout pattern and merely duplicates thereof. In any event, that read-write system would be adopted which conforms with the computer with which the PID card is used. This invention does not pretend to change or particularly modify standardized computer technology; rather, this invention covers only a very particular memory system and the corresponding read-write head that is required to make the card accessible to the computer. As for the card itself, it is a blank sheet, and with an appropriate read-write head can have put on it whatever is required.

When one examines critically the magnetic properties of the information storage system thus far disclosed, it will be seen that some further improvements are in order. To do this we shall first consider the hysteresis loop followed by all ferromagnetic materials, as shown by FIG. 20, where magnetomotive force, mmf, H is plotted against magnetic flux density B. When mmf is applied to all such materials, magnetic flux flows in the material and rises along the initial magnetization curve 162 to saturation value 163 ($H_s$, $B_s$). If the mmf is now decreased, the flux density does not follow back down the initial magnetization curve; rather it follows the path 164 to an interception of the B-axis at 165 and a value B = $B_r$, and thence along the well-known demagnetization curve through the points 166, 167, 168, 169 and back to 163.

For the first few mmf cycles, the hysteresis loop does not completely close but after a sufficient number of mmf cycles, the hysteresis loop is to all effects and purposes closed, and that is the loop which is plotted in FIG. 20.

The values 165 ($B_r$) and 168 ($-B_r$) are called the retentavity of the magnetic material. These points cannot ever be ideally occupied except in a completely closed magnetic ring, and because of this fact permanent magnetic memories in computers are often comprised of planes of hundreds of such rings, each tiny ring comprising a bit in the computer memory as shown by 112 and 113, FIG. 10. When a closed magnetic ring is magnetized to 113, FIG. 20, and allowed to fall back to 165, we have a "1-state" of the binary code; while if a ring is magnetized to 167 and allowed to fall back to 168, we have a "0-state". It is obvious that these two states are arbitrary, have only relative significance, and no meaning until a choice is made by the specific connections of a particular computer. Theoretically, the exact intercepts, $B_r$ and $-B_r$, can never be sat upon in a static system because even the very best ferromagnetic materials have some reluctance and there invariably in some flux leakage even from a ring. Accordingly, the very best we can do in computer practice is rest at 175 ($B_r'$) or 178 ($-B_r'$); however, $B_r'$ and $B_r$ may be so close together in reasonably good materials that it would be difficult to destinguish between them. The point to be made here is that we do not have to exactly occupy $B_r$ and $-B_r$ to have good effective computer memory elements.

The intercepts 166 ($-H_c$) and 169 ($+H_c$) of the hysteresis loop are called the coercive points. These are the positions occupied by perfectly-open hard, or semi-hard magnetized magnetic materials — in other words, permanent magnets. Like the $B_r$ points which are not ideally occupied because no ring of material is ever perfectly closed, the $H_c$ points cannot be ideally occupied either because no piece of ferromagnetic material is ever completely open; hence we have the points 176 ($-H_c'$) and 179 ($+H_c'$). In a long needle-like piece of material, the closest we can come to an open magnetic piece, the points $H_c$ and $H_c'$ may be graphically indestinguishable. As with the $B_r'$ points, the fact that we never ideally rest on Hc does not keep us from utilizing permanent magnets because we usually convey the flux from a permanent magnet to some working gap and consequently ride far back up on the demagnetization curve to some point such as 185.

In a magnetic recording medium, the strength of the pole is fixed by the product $H_c$, an intrinsic property of the material, and the length of the pole. This brings out the weakness of the bit dots formed on 42 of the PID card, FIGS. 4 through 6, when 42 is a single simple isotropic magnetic sheet. Unless 42 is made fairly thick, the bit pattern, while workable, will be weak. If 42 is greatly thickened, both the weight and cost of the PID card will be greatly increased; at the same time, the reliability of storage in a single, thin, completely-open (or nearly so) magnetic medium is not always as good as one would like it to be.

One way to improve this situation is to dimple the magnetic material at every pole center as illustrated by FIG. 13, where 131 is the flat magnetic film and 132 is a typical dimple. These dimples can be applied either before the film is sandwiched between supporting plastic pieces, or afterward, and can be accomplished by a press having pointed punches arranged in the identical pattern of the read-write head. This dimpling increases the pole length from $H_1$ to $H_2$, or from a mil or two to as much as 20 or 30 mils, a mil being 0.001 inch.

What we would really like to obtain is the ideal ferromagnetic storage system provided by the closed magnetic ring, 112 and 113, FIG. 10. We can readily punch holes in a flat film of magnetic material but the only way such holes can be magnetized as rings is to pass conductors of current through the holes. This is quite impractical for PID cards in view of the number of connections required; however, alternative solutions are provided by the present invention which come reasonably close, one embodiment of which is shown in FIGS. 21 and 22, where each bit is comprised of a memory eyelet 194, each section of which is a closed ring, except for the gap 198 which we purposely leave so that the memory eyelet can be externally magnetized by bringing a pole of a read-write head adjacent to the eyelet and passing current through the coils of the head as heretofore explained. When this is done more flux will pass through the neck 199 of the eyelet than across the gap 198. Accordingly, if the neck of relatively thin material is saturated magnetically by the passage of currents in the coils of the read-write head, the magnetic state of the eyelet material will go to saturation and then fall back to positions 185 or 188 on the hysteresis loop of FIG. 20, the 1,0 bit states of the memory eyelet, it being assumed that the eyelets are fabricated from relatively soft permanent magnet materials such as high carbon steel, chromium steel, tungsten steel, etc. These materials have coercive forces ranging from about 50 to 250 and $B_r$'s of the order of 60 kilomaxwells per sq. in.

This arrangement may not be as good as completely closed magnetic rings but it comes reasonably close, and how close it gets depends upon the length and area of the gap, as compared with the path length through, and permeability of, the magnetic material of the eyelet.

In actual construction the ferromagnetic eyelets 194 would be assembled on a thin non-magnetic substrate, as stainless steel of a few mils thickness, or brass, and this assembly compressed between two thin plastic sheets 193 and 195. With this arrangement of eyelets, one can get some 660 bits in a card of the size shown by FIG. 4, with a bit spacing, center to center, of one-eighth inch. This number of bits is adequate to contain 20 or more names or words and a considerably larger quantity of numbers, depending upon the length of same, and this is more than adequate to handle credit card operations as practiced today. With bits placed on one-sixteenth inch centers, using eyelets about 50 mils in diameter, four times as much information can be accomodated by cards of the same size. Using automatic card machinery, this density of information storage is quite practical.

Continuing with FIGS. 21 and 22, 196 is the central hole, or opening, of the ferromagnetic eyelet 194, and it might or might not be filled with plastic from the sheets 193 and 195, depending upon the method of fabrication. 197 indicates arrows showing the direction of magnetization of the eyelet for one of two possible states.

FIGS. 23 and 24 illustrate still another means of forming eyelet-type bits. 206 is a stainless steel, brass, or other non-magnetic substrate, 207 is a suitible ferrite eyelet or bead having a narrow neck 209 though a circular opening in the substrate 206. This eyelet can be magnetized in the direction of the arrow 208, or the opposite, to form a "1" or "0". If the substrate 206 is only a few mils thick, and the neck 209 has an areal cross-section considerably smaller than the gap area 205, the eyelet will form a nearly-closed magnetic storage bit, as previously described in connection with FIG. 21.

One other arrangement for forming magnetic storage bits of the eyelet variety is of significance - that of FIGS. 25 and 26. In FIG. 25, which is a typical greatly enlarged cross-section through the PID card, a non-magnetic substrate which has previously been punched full of holes, in a pattern corresponding with the pole pattern of a read-write head, is overlain on both sides with ferromagnetic films 216 and 217, and these films are punched into holes from both sides and welded together at 215 to form a pole bit. 219 shows a typical hole in the substrate 218 that has not yet had the pole bits pressed into it. Operation of these bits will be essentially the same as described for FIGS. 21 and 23, and 214 indicates a set of arrows which show the state of magnetization of those portions of a bit that get most intensively magnetized.

FIGS. 14 and 16 show an arrangement of read-write poles, as 161 in the base 160, and 181 in the cover 150. The pole 161, circular in shape, with typical read-write coils 221, 321 and 421, is coaxial with circular cavity 171 in the cover 150, leaving annular pole area 181 to mate magnetically with 161. As a result, when the PID card is placed in the read-write head, the magnetic recording madium of the card is situated about as shown by FIG. 15, so that when coils 221 and 321 are simultaneously energized, each with one-half the current required to to flip a pole bit from one state to the opposite, lines of magnetic flux 202 flow somewhat as shown and the annular ring area 201 is magnetized with a strong horizontal component as well as some vertical component. This will be especially so if the protective plastic covering film of the PID card is very thin on the pole-161-side of the card so that pole 161 comes very close to the inner boundary of 201, with the necessary card stiffening thickness of plastic coming on the cover or pole 181 side of the card.

In FIG. 15, the magnetic recording film is shown pre-punched with a pattern of circular openings 190, 191, 192, etc., with the spacing and positioning throughout the entire card so arranged as to completely align with the corresponding pole structure of the reader head. Accordingly, with the currents in coils 221 and 321 flowing clockwise around pole 161, we get the magnetization pattern of FIG. 18 as indicated by the arrows 202b; with the currents in 221 and 321 flowing counter clockwise we get the magnetization pattern of FIG. 17 and as indicated by the arrows 202a. Quite arbitrarily, we say that the magnetic pattern of FIG. 17 represents the "1-state" of the magnetic bit, while the magnetic pattern of FIG. 18 represents the "0-state".

While for drafting convenience the outer boundaries of the magnetic patterns of FIGS. 17 and 18 have been made circular, no such sharp outer boundaries as these will be found in the card film. All outer boundaries join each other and the outer boundary pole structures taper-out and join together. Only in the magnetic film areas adjacent the punched openings will the pole structure remain concentrated and well-defined. Because of this, the magnetic areas will not be completely open, nor completely closed so that in bit storage we will operate on the hysteresis loop of FIG. 20 somewhere between the points 165 and 166, or 168 and 169, depending upon whether a 1 or 0 is being stored. Due to the enormous leakage-flux area of what effectively amounts to the entire magnetic film area of the PID card, as compared with the area of the inner edge of each hole comprising a bit, we will effectively have a small air gap and so should operate pretty high on the demagnetization curve.

The simplest arrangement as far as the PID card is concerned is to provide a single continuous sheet of magnetic film, having no pre-built pole structure, sandwiched between two pieces of plastic. When this type of card is placed in the read-write head structure of FIGS. 14 and 16, we get the magnetized pattern as represented by FIG. 19, or the opposite thereof, again depending upon the direction of the currents in the coils 221 and 321 of the head.

FIG. 29 shows still another structure which read-write head and PID card can be given. 270 is the ferromagnetic body of the cover or upper member of the head and it is equipped with poles 271, 272, 273, etc. 280 is the ferromagnetic body of the base or lower member of the read-write head and it is equipped with poles 281, 282, 283, etc. One or both of these sets of poles are equipped with energizing coils as heretofore described.

The PID card 289 is comprised of sheet films 277, 278 and 279 sandwiched between plastic or other non-magnetic structural sheets 267 and 268. The latter are dimpled where the pole tips contact the card, as 284, and corresponding to the complete pole structure, so that when the PID card is placed in a read-write head the poles 271, 272, 273, etc., and 281, 282, 283, etc., come as closely as possible to the magnetic films 277, 278 and 279.

Two structural divisions are possible: that of FIG. 29 wherein the central magnetic film 279 is punched with a set of circular openings corresponding to the pole structure; and that of FIG. 33 wherein all three magnetic films are continuous throughout the entire PID card.

Considering the structure of FIG. 29 first, we take the case where the outer magnetic films 277 and 278 are both composed of magnetic material described by the arrow hysteresis loop 248 of FIG. 32. With any given pair of poles, as 271, 281, energized with current, magnetic flux will flow from pole 271, say, into film 277 where it evades hole 141 and flows radially into and through the poorly defined annular area 151 of film 279 surrounding hole 141; thence into film 278 and into pole 281, it being assumed that the bodies 270 and 280 are magnetically connected by leakage or otherwise.

If the magnetic flux that flows as above described is sufficiently strong, the saturation point 222, FIG. 32, for all three magnetic films will be reached and the film volumes through which this flux has flowed will be momentarily saturated. If the exciting current in the coils about poles 271 and 281 (not shown) suddenly falls to zero and the driving mmf collapses, we are then left with an annular area 151 yoked by more-or-less circular areas of the films 277 and 278, comprising a magnetic system each section of which has a double-back-back U-shape. If the annular volume 151 of the harder magnetic material, as represented by the fat hysteresis loop 249, FIG. 32, was left to itself, we would have a ring magnet operating near the point 214 on the graph of FIG. 32. On the other hand, if the film discs on either side of 151, of soft highly permeable material, were left to themselves, the operating point would be close to 232 on the graph. Considering the combination of films comprised of hard and soft magnetic materials, the operating point will lie somewhere between these extremes and will fall on a curve joining the points 214 and 232. Since the annular volume 151 is poorly defined and increases in areal extent, the larger the effective radius, only those volumes near the hole 141 will get completely saturated and hence described by the graphs of FIG. 32. Furthermore, if the actual operating point should fall to the left of 234, the film volumes of 277 and 278 adjacent poles 271 and 281 remain saturated and hence effectively reduced to air gap volumes. The flux would then be obliged to flow entirely through the outer U-shaped paths accordingly, the actual operating point of the annular sandwich, adjacent the pole structure must lie at a value of −H less than that of point 234, as point 213, or very high up on the curve 224.

Similar considerations apply to the opposite phase of the hysteresis loops of FIG. 32 so that binary storage bits in the configuration of FIG. 29 will be flipped from 213 to 245 along line 247. The poles 271, 272, 273, etc., at the tips would be about the same size and shape of the writing ball of a ball-point pen, for example.

Referring now to the recording medium 300 of FIG. 33, comprised of sheets 301, 302 and 303, of magnetic materials, sandwiched between plastic sheet 304 and 305, and comparing with recording medium 289, FIG. 29, the only differences are that the central member 302 is a plane continuous sheet without holes, and the plastic sheets 304 and 305 do not have dimples. As heretofore mentioned, the simplest and most preferred form of recording medium for PID cards is one that is uniform throughout, has no positioning or orientation problems prior to the first placement in a read-write head. With this type of material, cards can be freely punched from pre-fabricated sheet stock without any particular manufacturing problems and the cost kept reasonably low. At the same time it is highly desirable to have the binary bit pattern recorded in such a way that it is not easily destroyed or altered. These objectives are accomplished by means of the recording medium of FIG. 33.

As before, sheet 302 is composed of semi-hard magnetic material similar to that used on standard magnetic recording tape. Sheets 301 and 303, which overlay 302, are on the other hand, comprised of soft high permeability materials with narrow hysteresis loops, such as those going under the trade names of mumetal, permalloy, supermalloy, etc. Considering the latter and the increasing scarcity of nickel which they all contain, research literature continues to show that from the point-of-view of high permeability there is nothing better than pure iron; consequently, if good means can be found for depositing thin films of pure iron on non-magnetic substrates, such thin films of pure iron would make excellent sheets 301 and 303. While it is not mandatory, it is nevertheless preferable that all three sheets, in the thicknesses employed, have the same saturation points so that they work well together to provide maximum storage energy in a minimum of space. This does not necessarily mean that the three sheets have the same specific or intrinsic saturation points, since the relative thicknesses, and hence the magnetic path lengths, can be made a matter of choice. Under these circumstances, and assuming currents around the poles of the read-write head of sufficient magnitude to completely saturate the three magnetic materials in the areas directly between poles, the magnetic flux will then fringe out from these dots to where the recording media are no longer saturated because of the increased magnetic path lengths. When the magnetizing current ceases to flow, the central dots in the sheet 302 of semi-hard magnetic material will remain magnetized, and taken alone would fall near to the points 214 or 229 on the hysteresis loops of FIG. 32; however, these magnetized dots are almost completely shunted by the highly permeable sheets 301 and 302 having an areal extent of the entire PID card, and since the separation of these sheets is no more than the thickness of 302, to all effects and purposes and purposes each magnetic dot operates in a nearly closed magnetic system and hence at, or very near, to the points 232 or 238, FIG. 32.

In addition to providing each magnetized dot with a closed magnetic system, the sheets 301 and 303 further serve to shield the dots from external magnetic forces and possible destruction. To destroy a dot requires a finely concentrated field of sufficient strength to swing the dot from some point near 212, FIG. 32, for example, to the opposite saturation point, as 223. With any demagnetizing force less than this, the dot will recover once the force has been removed.

It is also clear that two-sheet magnetic memory storage systems comprised of one highly permeable material overlaying a sheet of hard, or semi-hard magnetic material. The two could, for example, be deposited on the two sides of a thin sheet of mylar, respectively, or other suitable substrate.

The density of information storage once can get on cards on the type described will be determined, not so much by the cards, as by the read-write head, some embodiments of which have been partially described in connection with FIGS. 11 and 12. While one can quite readily place one-thirtysecond diameter poles on one-sixteenth centers and wind each pole with several windings of one or more turns of AWG. 24 magnet wire, for example, these read-write heads are not, however, fabricated in a manner which can give the greatest pole density, nor the least coast of manufacture.

FIG. 27 shows in cross-section a novel and economical way of forming a high density array of poles for a read-write head. 260 is a sheet of suitable magnetic material, many forms and alloys of which are presently available on the market, in which all of the poles 261, 262, 263, 264, etc., are accurately pressed by means of a suitable die. 230, 240, and 250 are printed circuits on thin sheets of plastic. Three such circuit sheets are shown but more can be provided if required. FIG. 28 illustrates two of the three coil patterns that are necessary; the column sheet 250 and the row sheet 240. The signal readout sheet 230, FIG. 27, is not shown in FIG. 28 as it is essentially a duplication of the other two taken together. Each circuit sheet has an etched conductor pattern on each side, and is punched to fit the array of poles 261, 262, 263, etc., of FIG. 27.

Referring now to FIG. 9, the ++++++, reference numeral 101, indicate the pole centers of the read-write head. A conductor 241, on the top side of sheet 240, represented by the continuous lines, winds alternately around a row of poles as shown. A conductor 242, on the bottom side of the sheet, represented by the broken lines, and joined to 241 at the end of a row, winds alternately around the same poles but in the opposite phase, crossing 241 between each and every pole. Thus, if the two conductors 241 and 242 of each row are joined together at the end of the row, as stated, by means of suitable feedthrough eyelets, or other suitable feedthrough connection, and a voltage applied between 241 and 242 at their beginnings, current will flow in the conductors as determined by the polarity of the applied emf., effectively making one-turn current loops around each pole. The poles in such an array will be charged alternately N and S, and one might at first imagine that we have arbitrarily created an unalterable 10101010 . . . . array. But since we know this is going to happen we can arrange to take care of it. We merely say that when all odd-numbered poles in a row or column have N up and S down, we have a 1, while for odd-numbered poles when N is down and S it up we have a 1. Similarly, for even-numbered poles, when N is up and S down, we have a 0, and with N down and S up we have a 1. Since the condition of the poles is determined by the direction of the currents in the current loops, and these currents are all that the computer has at its disposal, we could't really care less what polarity of poles is named for 1's and 0's. as long as the naming is consistant and the computer programmed accordingly.

The column winding pattern, FIG. 28, is executed in exactly the same way as the row pattern. The only thing we have to provide is to make sure that the column sheet currents phase the poles in agreement with the row sheet. This we do by merely setting the sheet on the right set of poles at the beginning and everthing is automatic thereafter. Alternatively, we can set the sheets as we please and then find the correct connections for the row and column conductors. Afterall, there are only two way the row and column conductors can be connected and a computer might be programmed to find its own consistent connections, after the manner of a child learning to use its nearly blank brain.

Similar arrangements are made for the readout array 230 of FIG. 27. The only difference is that all poles, both those of columns and rows, are looped by the conductors criss-crossing on the two sides of one sheet. In reality, the readout sheet, which has the same alternate pole alternate pole structure as the rows and columns, ties thing together for the computer, once relative row and column emf polarities have been determined, and eliminates the alternating pole structure from further consideration. Considering that there will never be a signal readout in the sheet 230, if sheets 240 and 250, one or the other, have emf polarities reversed, the computer could even be taught to recognize this fact and flip an internal reversing switch, or demand that a wiring change be made.

Thus, the preferred embodiment of read-write head of this invention merely consists of an assemblage of printed circuits of the form of FIG. 28 on each side of the recording medium of FIG. 33, with insulating films 200 placed between the prented circuits.

This is better shown in the fragmentary cross-section of FIG. 34 where the read-write head has been reduced to two thin ferromagnetic sheets 360 and 376 and six printed circuit sheets 362, 364, 366, 370, 372 and 374. The PID card 368 of the same basic construction as 300, FIG. 33, is comprised of two outside covering sheets 368a and 368e, two soft thin high permeability sheets 368b and 368d, and a central hard, or semi-hard magnetic sheet 368c of requisite coercive force. This drawing is enlarged about 20:1, as a representative engineering construction, with magnetic pole axes 377, 378, 379 and 380 on 0.050 - inch centers (50 mils), and running perpendicular to the foregoing sheets. Until a PID card has once been used, magnetic poles as such do not exist, since each of the sheets of the card is initially uniform throughout and having no information storage. On the right-hand edges of FIG. 34, a column of figures shows the approximate mil-thicknesses of the constituent members of the complete memory structure, and these tally up to 0.152 inch.

The two big advantages of the structure of FIG. 34 are: the bit storage density can be obtained and the fact that high-speed press and etching techniques can be employed in its fabrication. It can be turned out using machinery of the same type as is used to produce the Sunday morning funny papers. Obviously, this structure is adaptable to computer memories as a whole class and is not restricted to PID cards.

Using the dimensions of FIG. 34, a storage density of at least 2800 bits per cubic inch is readily available — or roughly 36-million bits per cubic foot. Since a greater space allowance has probably been made for each bit in FIG. 34 than will ultimately be found necessary, it is not too much to expect that a storage density of 100-million bits per cubic foot is within reason. All of this information storage, like that of the core storage presently used in high speed computers has fast access time. Summarizing, the preferred information storage structure of this invention has: (1) high storage density; (2) low production cost; (3) fast access time. Its use should materially assist in bringing the cost of electronic computers down, since information storage presently is one of the highest computer costs.

Considering now some of the details of FIG. 34, we assign printed circuit 366 the signal readout duty since it is one of two printed circuit sheets which lie closest to the magnetic memory structure 368. This sheet, 366, has etched circuits 366a and 366c on the two sides of the sheet, on the form of FIG. 28, with typical current conducting half-loops, 390 and 391, about each pole axis 377. Similar current half-loops are represented by the other cross-hatched areas of the drawing, and pairs of current half loops, as 390, 392 and 391, 393 comprise full current loops about the respective loops about the respective pole axes, as heretofore explained in connection with FIG. 28.

Again, referring to FIG. 34, we assign printed circuit sheets 362, 364, 372 and 374 the duties of column and row destruction readout, also as above explained, except that where sheets 240 and 250, FIG. 28, each carried one half the current required for destructive readout, sheets 362 and 364, on one side of the magentic memory structure 368, are each allowed to carry only one fourth the current required for destructive readout. Companion column and row sheets on the opposite side of magnetic memory structure 368 are also each given one fourth of the current required for destructive readout. In this way, a nearly solenoidal magnetic field is applied to each axial memory element, as indicated by the systems of arrows 381, 382 and 383. If only column or row currents, together equalling one-half-readout are applied simultaneously to an axial element, nothing in particular happens as before explained, and as indicated by the pairs of arrows 381 and 382. But when two column one-fourth-readout currents, and two row one-fourth-readout currents are simultaneously applied to a particular pole axis, total unit-readout, as indicated by the four arrows 383, is obtained, each arrow representing one-fourth-readout, and the axial pole memory element is flipped.

The printed circuit sheet 370, adjacent the magnetic memory sheet 368, from the under side, can be used as an inhibit sheet in the write-back operation, or for some other purpose. Obviously, other printed circuit sheets can be added to the structure as required; and it is equally obvious that some printed circuit sheets can be eliminated. For example, if we are willing to settle for a read-write field that is slightly less than perfect, we can dispense with three of the printed circuit sheets and go to one-half-readout column and row sheets and a signal readout sheet. This simplification, which may be entirely good enough, would further reduce the height of a memory stack and decrease the cost. What has been disclosed in FIG. 34 is essentially the ideal structure, and deleting some of these members without departing from the methods and principles of this invention does not get around the invention.

Again returning to FIG. 34, the central flux 383, driven by currents in sheets 362, 364, 372 and 374, will flow as a stream in lines nearly parallel to the axis 379, from ferromagnetic sheets 360 to ferromagnetic sheet 376. The thickness and maximum flux density of sheets 360 and 376 are so chosen that these sheets will readily carry more than enough central flux to saturate the axial magnetic memory elements; consequently, the central flux 383 rounds abrupt corners in each of sheets 360 and 376 and thereafter flows inside each sheet, parallel to the plane of the sheets as indicated by the broken lines 384, 385, 386 and 389, until it leaks from one sheet through the other back through the entire assemblage.

The sheets 360 and 376 are separated by a distance of approximately 0.128 inch. the area of a PID card, FIG. 4, is of the order of 12.8 sq. in.; consequently, the permeance of the magnetic space gap, considering the entire space as having a permeability of only 1, is of the order of 100. This is a pretty good permeance - equivalent to that of a gap of only 1.6 mils in length and having a pole area of $0.4 \times 0.4 = 0.16$ sq. in. Thus, there is no problem of returning leakage flux; and essentially the only mmf that is required is that necessary to drive the central flux 383 through the memory element.

In FIG. 34, the sheets 361, 363, 365, 367, 369, 371, 373 and 375 are insulating sheets of about 5 mils thickness, or less. Also, the central core of each printed circuit sheet is an insulating substrate, as 362b of sheet 362. All six printed circuit sheets have a similar construction. Connection to the conducting ribbons of the current sheets are made by means of small flexible wires in twisted pairs, as shown in FIG. 35, or by other suitable means.

We come now to one of the most important aspects of the present invention that of personal information security. As already stated, the information on the card, and the license to use any or all of it must primarily remain with the owner of the card at all times. Secondary control should also be available to the agency that issues the PID card, or otherwise joins with the actual owner of the card in taking responsibility for the card's use.

It may not have been noted that the PID card of FIGS. 4 through 6 is perfectly rectangular and has no orientation marks or edges as does the standard punched card of FIG. 1, for example, where the slanting edge 12 is purposely provided to prevent cards from being placed in a reader in any other than one orientation. In the present invention, we purposely make it possible for the PID card to be placed in the read-write head in at least eight different orientations, labeled Mary, Alice, Sarah, Jane, Henry, George, John and Mike, or carrying corresponding nunbers 1 through 8 in case people don't like assumed names. For this purpose, I have provided the cross configuration of read-write head displayed in FIGS. 7 and 9. The choice of orientation of PID card in the read-write head is at the option of the owner of the card, and is the first element of security. All that is required is that the card owner remember at the next use of the card whether he or she elected at the last use of the card to be Mary, Alice, Sarah, Jane, Henry, George, John or Mike, and that he or she put the card in the read-write head accordingly.

As was pointed out above, the array of 1,0 bits is meaningless until one gives some meaning to them; i.e., programs them. The orientation of the card in a read-write head is the first act in programming this card, and this is a security programming act.

For the computer to make sense out of the array of bits on the card, it is only required that the card be placed in the read-write head — next use, in identically the positon it occupied when the computer put the information on the card — last use. Thus, if the card owner elects to be Mary at last use, he or she must be Mary at next use. But he or she need not remain Mary forever, because as shown in FIGS. 7, 9, and 30, I have provided a set of buttons labeled Mary, Alice, Sarah, Jane, Henry, George, John and Mike. If the owner of the card elects the change into George at next use, all he or she need do is press the George button when the card is placed in the read-write head, and the computer will be programmed to put the information back on the card in a "George" configuration following destructive readout, even though the George configuration is a 90° rotated mirror image of the "Mary" configuration. In other words, the computer will have built into it a program of how to get from any one of eight names to any one of eight names. To do this requires that we permanently fix at least one assymmetrical bit in each card as well as the four possible pole locations where this bit can be found, or in effect give up four bits to security. Exactly where these bits are located on the card is a matter of no great importance.

To provide a more complicated personal security system having more than eight choices, it is only necessary to give up the card orientation scheme and use the security buttons altogether. With this security system, the card is always placed in the read-write head in the same position and security buttons, 77, FIGS. 7 and 30, punched to program the computer in read the card in the manner in which the information was put on the card at last use. If at that time, the card owner elected to be Mary George Doe, for example, he or she will insert the card in the head, press the buttons labeled Mary George Doe, or 1 - 6 - 9, and after this press the READ button or knob 94 of the cover 71, and this operates switch button 79 that is under 94, 80 being a spring preventing cover 71 and knob 94 from accidentally closing on 79. When this has been done, the computer removes the information from the card and places it in the computer working memory.

After all transactions have been completed, and the card owner wishes to assume a new name, or number, he or she will first depress the SEC button 78, FIG. 7, punch out the new name or number on the security register 77, and following this depress the RLS, or RELEASE button 81, and the computer will put the information back upon the card programmed as requested. Depressing the RLS button 81 will also unlock the cover and permit the card to be extracted by the owner. An interlocking system, not part of this invention, is provided to prevent reclaiming the card until all required operational steps have been completed.

To provide additional security, as that which may be provided by the agency issuing the PID card, use is made of a few bits to register a name, or number, and a date. As of such-and-such a date the issuing agency states: "Your number will be so-and-so," but doesn't necessarily tell the card owner what this number is. Accordingly, the computer is programmed to recognize numbers that are assigned from time to time in terms of last use dates. For example, suppose that the issuing agency said that after 10-14-69, all credit cards of this agency will be coded 123 987 45, the previous code number having been 999 777 99. If I present my card to a read-write head and my last use date was prior to 10-14-69, the computer will recognize the 999 777 66 number on my card, if it is there, and I'll pass as a legitimate card owner. If, on the other hand, some other number is on my card, or if the last use date is after 10-14-69, and the new code number 123 987 45 is not found, I'll be recognized as a phony.

For obvious reasons, these dates and numbers will not usually be programmed by local read-write heads; rather they will be supplied from the general offices of the agency through the connecting electrical cable 98, operating in conjunction with telephone or other universal facilities. Accordingly, the agency security code can be changed as often as necessary and without calling old cards back or issuing new ones. The change is automatic once a card owner inserts his card in a read-write head after the change has been made. Thus, the card owner has a security key to his card, and the issuing aency has a key, and both are required to program and operate the computer. The best security system is an ever-changing security code, and this feature is provided both for the card owner and the issuing agency. Furthermore, the issuing agency, from its headquarters, can always question or even cancel the use of any particular customer's card by putting a computer "stop" order on a card with a given identifying number.

Referring once more to FIGS. 7 through 9, a form of read-write head best suited to resturants, hotels, airlines and retail stores has been shown — those places where the business transacted takes the form of a cash sale, as when a person purchases a meal at a resturant, pays for a hotel room, buys an airline ticket or a suit of clothes. The read-write head is normally placed on a counter with the agency clerk on one side of the counter and the customer on the other side. Accordingly, a standard adding machine type keyboard 74 faces the clerk while the security keyboard 77, and the other security keys 78 and 81 face the customer. Duplicate tallying counters 83 and 84 are provided to show the total amount of the transaction, one facing the clerk and one facing the customer. Thus, the customer having finished his meal, say, comes to the counter, places his PID card in the open head of the computer, FIG. 9, at a chosen orientation, as for "2 - Alice", and/or punches appropriate security buttons of the security register 77, brings the cover 71 down over the card but doesn't yet depress the READ knob 94. The clerk now operates the register 74, punching out the dollar amount of the transaction which immediately shows on the counters 83 and 84. This can be a single item type sale, or it can be a multiple item sale. If the latter, the clerk punches button 75 after each item of sale and twice at the end of the sale. When the clerk has finished his work, the customer looks at counter 84 and if he agrees with the amount shown, and doesn't wish to change his security name or number, he depresses the READ knob 94, and the transaction is completed. The computer instantly performs its duties: (1) reads the customer's PID card; (2) records the transaction for both customer and agency; (3) puts the appropriate information back on the PID card, as programmed; and (4) releases the card.

The record of the transaction which the computer makes for the customer is in the form of a sales slip which the computer kicks out through slot 96, FIG. 8. The record which the computer makes for the agency can take several forms. It can be a duplicate of the customer's record printed on an internal tape roll, which can be removed once a day and tallied on the books of the agent company; it can be a record on a magnetic tape which is read back at some later time and transferred to the computerized bookkeeping system; or it can be instantly transferred via cable 98, and telephone or other interconnecting lines, to a central location.

If the customer's PID card contains the outstanding balances of his credit account, these figures can of course be made part of the recorded information, with the final state of balances applied to the card when the other information is read back. Alternatively, if the customer, or PID card owner, and the resturant owner or agency have mutual relationships with one or more banks, a complete transaction can be carried out. The amount of the sale can be transferred to the bank account of the agent and deducted from the bank account of the customer, with these transactions and the final state of accounts transferred to the customer's PID card and the agent's ledger sheet. To serve the latter end, the agent needs a ledger sheet in the bottom of the read-write head, say, that is essentially a duplicate of the customer's PID card, except that it is larger. If agent and his bank are wire-connected on a retaining basis, nother further need be done; if not, the agent can take his ledger sheet to his bank once a day where all transactions are transferred to bank accounts, while the customer takes his PID card to his bank whenever he makes a deposit/ and/or as otherwise might be required.

Release of the PID card, after all transactions have been completed, can also take several forms. The cover 71, which is locked in place throughout transaction time, is released by the computer, and the cover then lifted by the customer and his card removed. Alternatively, the card can be kicked out through slot 91 by the computer when all transactions have been completed. Again, if the PID card can be kicked out through slot 91, it can equally well be inserted through the same slot, and this would have the additional advantage that the security orientation of the card would not be so obvious to the clerk and other people who might be standing at the counter.

In FIGS. 7 and 9, reference numerals 87, 88 and 89 refer generally to the keys of the payout register 74, while 85 and 86 typically refer to keys of the security register. 92 and 93 indicate spaces that have been left where additional keys can be put whereby other programs can be given to the computer. 67, 68, 69 and 70 refer to corner card guide positioning edges whereby the PID card is accurately located and positioned in the head. 72 is a hinge which permits cover 71 to be lifted, and 97 is the handle which attaches knob 94 to cover 71. Reference numbers 99 and 100 indicate read-write head areas not being used when the PID card is in the position shown but which would be used if the card was turned at right angles.

102 represents a cut-away in the PID card whereby the surface of the head is exposed, and pole locations noted, as 103. Similarly, 104 is a cut-away in the surface of the head exposing the actual circular pole structure 105 of the head. 106 refers to some poles of the head which might be employed in the security operation as heretofore explained. 101 indicated typical pole locations in those parts of the head not presently being used.

Referring to FIG. 8, 95 indicates a break in the head mechanical structure whereby the depth of the read-write machine can be extended as may be required by particular models of manufacture. In other words, the read-write head structure is not considered fixed by this invention and is representative only of some of the functions and operations that can be carried out. The head can be fabricated as a very simple machine which takes care only of the specific operational functions of a specific set of transactions. Alternatively, the read-write head can be expanded to include many or all of the computer operations which must be, or can be, carried out at each local setup.

When the agent is an automobile service station of an oil company, the read-write head and PID card are arranged to take care of many other chores than the mere cash sale transaction described above. For example, account is kept on the card of mileage and date of last oil change, oil and air filter changes, grease job, tire rotation, battery check, gasoline tank filling, etc. At each contact with the service station, the computer advises the customer of need service work, such as grease jobs, filter changes, oil changes, battery care, and additionally computes the miles per gallon obtained with the last fillup, and/or the fuel cost per mile, etc. With a few simple tests made on the car, an optimum fuel mixture for that car can be determined and the data recorded on the PID card. With this additional information, the computer would fill the car's gas tank with the desired fuel mixture automatically and charge accordingly. Again, the birthdates of all children in a family might be recorded on the PID card, so that when a family came into the service station on one of these dates, the computer would denote same, and there could be a small birthday celebration with appropriate gifts, etc. All of these things taken together would promote good automobile care, increase service station sales, promote goodwill, create interest and give the computer a certain amount of esteem — a thing the computer doesn't enjoy in most families, since all that most computers are presently programmed to do is kick out bills and frequent reminders. Not even the rick like these, much less the poor. With appropriate input of data, as from the PID cards of the invention, computers can as readily be programmed to help people as kick them around. As a matter of fact, what computers do is a reflection of the state of mind of the people that use them.

Further adaptations of the read-write head, and hence the programmed information put on PID cards, to accommodate other business, social and governmental agencies is possible and the examples here provided do not imply any limitations of the invention. Indeed, and as above noted, the read-write head, including the working memories, switching circuits, programming buttons, mechanical printers, etc., that in some embodiments are contained within and included by the terminology read-write head, plus the memory comprised of a multiplicity of external cards, together may comprise a complete computer. Because this invention has greatly simplified the memory storage and memory functions of computers, and since the cost of memory storage and memory functions is a major portion of computer cost, the present invention goes far toward helping make at least simple forms of electronic computers available to individuals. Obviously, with appropriate changes made in typewriters and/or card punching machines, anything that can be typed or written can be magnetically stored on a card or sheet and used to replace IBM cards and punched tape records.

Again, in large computer operations the magnetic storage system of this invention can be applied to a continuous roll and run through a read-write heat at a high rate of speed to provide an information access time intermediate between that of core storage and magnetic tape as presently used, since a read-write head can be designed with a capability of reading a large sheet of information in about the same time that a magnetic tape reader now reads a single row or column.

FIG. 31 shows a personal information dossier comprised of four cards 256, 257, 258 and 259 connected by means of fabric or plastic hinges 286, 287 and 288. Once a PID-card system has been universally adopted one car per person or family will probably be adequate. Until that happy time arrives, however, more than one card per person will undoubtedly be required. Since a read-write head can be made in one or more forms whereby any one of a system of attached cards can be individually read, the arrangement of FIG. 31 is a convenient means of keeping all the cards in a single package. For example, the read-write head of FIGS. 7 through 9 can be used by providing sufficient clearance at the edges of the cover, when it is down, to clear a pair of hinges, as 286 and 287. When cards are inserted through slots, as 91, FIG. 8, means for moving any one of several cards into reading position can be worked out.

FIGS. 35 and 36 show two mechanical ways in which large condensed packages of information may be stored internally within a large computer, using the electromagnetic storage means of this invention. We'll consider that FIG. 34 is a greatly enlarged cross-section through the sheets of FIGS. 35 and 36.

In FIG. 35, the information storage sheets, as 391, 392 and 393, are assembled after the manner of the pages of an "uncut" book. The three printed circuit conductor patterns are crudely represented on sheet 391, where 395 is the row pattern, 396 is the column pattern and 397 is the signal readout pattern. The column pattern 396 can end with each sheet, as shown, and picked up on the next by means of a similar system of connections, or it can continue past one or more folds into succeeding sheets. The column pattern is provided with connecting leads, as 403, 404, 405 and 406 by means of which it is connected into the computer system. How many sheets of the "memory book" are continued to form single columns will depend upon the computer design, the accessability of information desired, the resistance of the printed circuit patterns, and the voltage available to drive the read-out currents, etc.

The row pattern 395 will usually extend over only one sheet, although once the book has been compressed several sheet rows can be connected together. How this is done is again a matter of computer design. 398, 399, 401 and 402 typically shows pairs of leads by means of which the row memory pattern is connected into the computer.

It is worth noting that the only requirement for connecting the "memory book" of FIG. 35 into a computer is the preservation of column and row pairs, and the identity of conductors within the pair. Accordingly, if the connections are made by means of pairs of insulated and molded-together conductors, after the manner of what the electronics industry calls "jukebox cable"; if one stranded conductor of each pair is tinned to present a silver color, while the other isn't and so presents a copper color, again as in standard "jukebox cable", or the two otherwise identified; and if at least three colors of outer jacket are provided, one color for each row, column and signal leads (if inhibit and other circuits are provided more jacket colors would be required) this is all of the identification that is required. It matters not which row and column gets connected where in the computer switching mechanism as long as individual row and column consistency is maintained. Once connected, the computer will continue to use each row and column as wired, and while the exact geometrical location of a particular piece of information within the memory may remain unknown, one really couldn't care less as long as the information stays there and the computer has quick access to it. This greatly reduces the hardship of connecting memories into a computer, since the wireman has, in the minimum case, only six identifications to make, although he must persist until all pairs have been connected. By the same token, if the same pairs are brought out at specific locations on the PC sheets, machines can be provided for making connections into the PC cards of the computer.

As can be seen in FIG. 35, each signal readout conductor pattern usually has only one pair of leads, as 408, 409, and the patterns continue from column to column, or row to row, until all memory poles, or axes, have been included. 407 shows a typical row interconnection.

FIG. 36 shows a computer memory bundle in the form of a roll of the electromagnetic storage means of this invention. 411 indicates the row pattern of conductors having pairs of leads 422, 423, and 424, 425; while 412 indicates the column pattern having pairs of lead 417, 418 and 419, 420. 413 indicates the signal reading pattern with a single pair of leads 415, 416, and intercolumn connections indicated by 414. Whether one such signal readout circuit is provided for each roll, or several, is again a matter of choice. Similar considerations apply to the column and row patterns.

FIGS. 38 through 41 illustrate just about the ultimate of what can be realized in condensed information storage utilizing the sheet storage media of this invention. The circular-shaped circuits of the previous arrangements wasted a considerably amount of sheet space; consequently, in the embodiment shown in FIGS. 38 through 41, I have gone to a rectangular circuit array as best shown in FIGS. 37 and 38 where 430 is a typical ferromagnetic bit, enlarged about three times, and 431 are typical row conductors, while 432 are typical column conductors. As shown, the conductors form a fine-mesh screen, overlaying the composite ferromagnetic sheet on both sides, in accordance with the structures of FIGS. 33 and 34 which otherwise apply. The conductor screen can be fabricated in the form of printed circuits using both sides of a thin sheet of plastic to conveniently get the crossing rectangular pattern, rows on one side, columns on the other. Alternatively, the crossing conductor pattern can be obtained by accurately weaving a screen of insulated magnet wires of about AWG. 36 and finer; again, magnet wires can be woven at constituent members of a sheet of woven fabric, or the magnet wires held in position while plastic or fibre materials such as paper or mylar are floated over and around them and pressed into sheets. Any number of existing commercial practices and techniques can be followed.

If the conductors of a printed circuit embodiment of this invention are 10 mils wide, spaced 10 mils apart and are 2 mils thick, we have a conductor that has a cross-section of about AWG. 36 wire, and with this spacing and thickness, and considering no more than four individual circuit sheets, we can get 50,000 bits per cu. in., and 86,400,000 per cubic foot.

Using a woven or matt fabric type construction, it appears that an even greater bit density can be obtained. Suppose that, for example, we have a fabric or screen sheet comprised of sets of five AWG. 40 conductors separated by 13 mils, and that two sheets of this type are required to scan the memory, one serving to provide column currents and one serving to provide row currents. This number of conductors will provide five independent circuits and this is usually sufficient in most computers.

Five AWG 40 wires, with tripple film insulation will not take more than 20 mils, and this plus 13 mils separation adds to give a unit separation of 33 mils, to yield a bit density of 900 per sq. in. The thickness of each complete memory sheet will be approximately as follows:

| | |
|---|---|
| 1 external magnetic film shield | .001 |
| 2 current sheets as above described | .008 |
| 4 insulating film sheets | .0015 |
| 1 three-layer magnetic memory composite | .0015 |
| Total Memory Sheet Thickness | .0120 Inches. |

Accordingly, in a foot of height - 12 inches, we can compress 1,000 such memory sheets. At the same time, a linear bit density of 900 per sq. in. provides 129,600 bits per sq. ft., and multiplying this by 1,000 gives 129,600,000 bits per cubic foot. If we then utilize 36 bits per word, our memory will have a word capacity of 3,600,000. This is a greater information storage than is presently available to most computers.

If fabrication is accomplished a memory plane at a time, as for example a square foot, we will have 360 row connections, and 180 column connections, in the drivingg circuits, and one pair of connections for the signal circuit. The number of other connections required of the remaining conductors will depend upon how they are employed, but it will never be less than 2 nor more than 72 per circuit per square foot. FIG. 38 shows the detail as it pertains to one bit, such as 430 still further enlarged, 433 is the cental area through which the concentrated magnetic flux passes, as represented by arrow 434. 435 and 436 are the outer sheets of soft highly permeable magnetic material, and 437 is the portion of the harder magnetic sheet 438 that gets saturated by the magnetic flux which, if left to itself would fall to one or the other of its coercive points on the hysteresis loop, but which in the sandwich rises on the demagnetization curve to nearly $B_r$, or one or the other of the residual magnetization points determined by the two outer layers of the magnetic sandwich which now serve as yokes. 441, 442, 443 and 444 comprise one representative set of conductors forming a current loop, and 445, 446, 447 and 448 comprise a second set of conductors forming a square current loop FIGS. 40 and 40a show one way of connecting and driving a pattern of rectangular conductors. These conductors are arranged in columns $a, b, c, d, e, f, \ldots$ and the rows are similarly labeled $a, b, c, d, e, f, \ldots$, rows and columns being those areas which lie between a pair of conductors. Thus, rows and columns each cover all areas of the sheet, and in any particular instance produce squares $aa, ab, ac, \ldots, ba, bb, bc \ldots$, each of which is common to some particular row and some particular column. Column conductors are driven from terminals 461 through 468; while row conductors are driven from terminals 471 through 478, with the head and arrow terminations indicating continuations of the pattern. The corresponding row currents are $i_a, i_b, i_c, i_d, i_e, i_f \ldots$; while the column currents are $j_a, j_b, j_c, j_d, j_e, j_f \ldots$. If, as in standard computer practice, row and column currents are pulses, with each pulse having an amplitude equal to 1/2 the current it takes to saturate the magnetic volume 433, FIG. 8, for example, when these currents enclose the same square area, as aa, FIG. 40, the flux density is sufficient to saturate this area magnetically to form a bit. There is, however, one distinct difference as compared with standard computer practice. In the present invention closed current loops are formed only when row and column currents, bounding a particular square, flow similtaneously. It will be further noted that with each particular scanning situation, only alternate squares get magnetized, as aa, ac, ae, ... bb, bd, bf..., etc., to form a checkerboard array. In the alternate, unmarked squares, as ab, FIG. 40, it is seen that the row and column currents oppose each other so that the square is not magnetized. Furthermore, alternate row patterns that are magnetized will be oppositely poled.

FIG. 39 shows an arrangement of driving pulses which I prefer to use. 451 and 452 are the representative half-cycle pulses used to drive single row currents; while 453 through 456 are the corresponding half-cycle pulses of column current at twice the repetition rate as the row currents. Thus I would usually successively drive single rows while driving double columns. This not only permits me to scan a complete memory in half the time otherwise required (assuming that halving the number of scanning functions doubles the rate) but also permits me to pick up the alternate squares that would otherwise be missed. During the total time period, $T_1$ to $T_3$, row current is driven from terminals 471, 473, in the form of 451, FIG. 39, while the corresponding column current is driven from terminals 461 and 464 in the form of 453 and 454. During the time period $T_1$–$T_2$, when both $i_a$ and $j_a$ are positive, we pick up square aa, while during time period $T_2$–$T_3$, when $i_a$ is positive and $j_a$ is negative we pick up square ab. If it weren't for the empty alternate squares of the checkerboard pattern we could not do this. Accordingly, FIG. 40 represents the situation with respect to a given set of squares during time period $T_1$–$T_2$, while FIG. 40a represents the situation with respect to identically the same set of squares during the time period $T_2$–$T_3$.

FIGS. 41 and 41a correspondingly represent similarly disposed patterns of conductors, enclosing the same squares as FIGS. 40 and 40 a, and employed in the signal readout circuit. While this circuit will have real terminals 481 and 482, with a conductor junction at 483, I illustrate the situation using two sets of squares, one for each time period pattern, with imaginative terminals 484 and 485, and imaginative inter-connections 486 through 490. This permits a ready tracing of all signal paths during both time periods. If the signal conductor pattern is identical with the driving pattern, the alternating checkerboard polarity structure is completely removed, as heretofore stated.

The bit polarities, as above fixed, and the corresponding signals generated when the stored magnetic energy is released through destructive readout, we might define as "1s" in the binary code. With the reversed direction of row current, $i_a$, during time period $T_3$–$T_5$, and two-column current, $j_{ab}$, making a full cycle swing, we get "0's" in the same squares where we previously got "1's". Thus, by means of row currnet of frequency p, and two-column current of frequency 2p, appropriately phased, all operations on the magnetic memory of this invention can be carried out.

The remainder of the memory is swept by successively energizing dual columns while maintaining an appropriate drive in single rows. Accordingly, with the drive still applied to row a, columns c and d are next swept, and following these, columns e and f, etc. With all columns covered, row b is next driven with single frequency current and all dual columns swept with two-frequency current; then rows c, d, e and f, etc.

Obviously, the memory of this invention can be scanned or swept in a variety of ways that are determined by particular computer design. The only requirement is that each memory square, or bit, be uniquely determined for the two states of storage. While there have been shown and described and pointed out the fundamental and novel features of the invention as applied to the preferred embodiments thereof, it will be understood that various omissions, substitutions and changes in the form and details of the device as illustrated and in its operation may be made by those skilled in the art without departing from the spirit of the invention. It is intended, therefore, to be limited only as indicated by the scope of the following claims:

What is claimed is:

1. An electronic computer system comprised of more than one substantially indentical computers each of which includes means for reading and writing binary indicia representative of characters, means for storing information, means for programming said stored information, computer energizing means, alphabetical work writing means and decimal number writing means, said means for storing information comprised of two portions: a first portion of which is permanently contained within each of said computers and fixed with respect to geographic location; a second portion of which is not permanently contained in any of said computers and is not fixed with respect to geographic location, said second portion comprised of a multiplicity of cards retained and controlled by a multiplicity of individuals, and from time to time placed by said individuals in said means for reading and writing binary indicia representative of characters of said computers, with joint means privided within said cards, each of said computers and said computer system for a secure programmed release of information stored on said cards into said first portion of said storage means for storing information, each of said cards comprised of thin parallel sheet members in close proximity to each other, at least one of said sheet members comprised of ferromagnetic substance, said sheet member of ferromagnetic substance comprised of two thin sheets of ferromagnetic material in contact with each other, one of said thin sheets composed of ferromagnetic material having a wide hysteresis loop and a large coercive force, and the highest possible resudual magnetism consistent therewith, the second of said thin sheets composed of ferromagnetic material having a narrow hysteresis loop, a small coercive force and high permeability.

2. An electronic computer system comprised of more than one substantially indentical computers each of which includes means for reading and writing binary indicia representative of characters, means for storing information, means for programming said stored information, computer energizing means, alphabetical word writing means, decimal number writing means, said means for storing information comprised of two portions: a first portion of which is permanently contained within each of said computers and fixed with respect to geographic location; a second portion of which is not permanently contained within any of said computers, and is not fixed with respect to geographic location, said second portion comprised of a multiplicity of cards individually retained and controlled by a multiplicity of individuals, transported from place by said individuals and from time to time so applied by said individuals in said means for reading and writing binary indicia as to prevent the use of said information stored on said cards by anyone other than the individual card owners, as determined by the combination of the last previous and present applications of said card, said application under the control of said individuals, each of said cards comprised of a sandwich of thin parallel sheet members inclose proximity to each other, at least one of said sheet members comprised of ferromagnetic substance, said sheet members of ferromagnetic substance comprised of three thin sheets in magnetic contact with each other, one of said sheets composed of ferromagnetic material having a wide hysteresis loop and large coercive force, sandwiched between two other sheets of ferromagnetic material, each of which have narrow hysteresis loops, small coercive forces and high permeability, whereby the ferromagnetic material having a wide hysteresis loop and large coercive force is shielded from stray magnetic fields by the two thin sheets of ferromagnetic material which have narrow hysteresis loops, small coercive forces and high permeability.

3. An electronic computer system comprised of more than one substantially identical computers each of which includes means for reading and writing binary indicia representative of characters, means for storing information, means for programming said stored information, computer energizing means, alphabetical word writing means and decimal number writing means, said means for storing information comprised of two portions: a first portion of which is permanently contained within each of said computers and fixed with respect to geographic location; a second portion of which is not permanently contained within any of said computers, and is not fixed with respect to geographic location, said second portion comprised of a multiplicity of cards retained and controlled by a multiplicity of individuals, transported from place to place by said individuals, and from time to time placed by said individuals in said means for reading and writing binary indicia of said computers, whereby selected binary indicia are placed on said cards, or removed therefrom, with joint means provided within said cards, each of said computers and said computer system for the secure programmed release of information stored on said cards into said first portion of said means for storing information, each of said cards comprised of a sandwhich of thin parallel multiple sheet members in close proximity to each other, at least one of said sheet members comprised of ferromagnetic substance, said joint means for a secure programmed release of information comprised of at least eight card positions and orientations in said means for reading and writing binary indicia, corresponding to the edges and faces of said cards in combination, said indicia on said cards yielding sensible information only when said cards are placed in said means for reading and writing binary indicia in an identical position and orientation occupied by said cards, or otherwise determined by said computer, when said information was last put on said cards by said means for reading and writing binary indicia, said computer programming means in the least having a register of keys whereby said computer system can be programmed to remove information from said cards in one of said positions and orientations, and return said information to said cards in other selected positions and orientations.

* * * * *